US011416266B2

(12) United States Patent
Chivukula et al.

(10) Patent No.: US 11,416,266 B2
(45) Date of Patent: Aug. 16, 2022

(54) DEVOPS TOOLCHAIN AUTOMATION

(71) Applicant: Opsera Inc, San Jose, CA (US)

(72) Inventors: Ravi Kumar Chivukula, San Jose, CA (US); Chandra Ranganathan, San Jose, CA (US); Vasanthavishnu Vasudevan, Phoenix, AZ (US); Sundar Rajan Renganathan, Chennai (IN); Todd Barczak, Orlando, FL (US); Purushothaman Srinivasan, Chennai (IN)

(73) Assignee: Opsera Inc., San Jose, CA (US)

( * ) Notice: Subject to any disclaimer, the term of this patent is extended or adjusted under 35 U.S.C. 154(b) by 91 days.

(21) Appl. No.: 17/098,138

(22) Filed: Nov. 13, 2020

(65) Prior Publication Data

US 2022/0091854 A1 Mar. 24, 2022

Related U.S. Application Data

(60) Provisional application No. 63/080,557, filed on Sep. 18, 2020.

(51) Int. Cl.
| | |
|---|---|
| *G06F 9/445* | (2018.01) |
| *G06F 8/60* | (2018.01) |
| *H04L 9/40* | (2022.01) |
| *H04L 67/75* | (2022.01) |
| *H04L 67/306* | (2022.01) |
| *H04L 67/10* | (2022.01) |
| *H04L 67/51* | (2022.01) |

(52) U.S. Cl.
CPC .............. *G06F 9/4451* (2013.01); *G06F 8/60* (2013.01); *H04L 63/0272* (2013.01); *H04L 67/10* (2013.01); *H04L 67/16* (2013.01); *H04L 67/306* (2013.01); *H04L 67/36* (2013.01)

(58) Field of Classification Search
CPC ..... G06F 9/4451; G06F 8/60; H04L 63/0272; H04L 67/10; H04L 67/16; H04L 67/306; H04L 67/36
See application file for complete search history.

(56) References Cited

U.S. PATENT DOCUMENTS

| | | | | |
|---|---|---|---|---|
| 2020/0160458 | A1* | 5/2020 | Bodin | G06F 40/30 |
| 2021/0397418 | A1* | 12/2021 | Nikumb | G06F 40/30 |
| 2022/0021652 | A1* | 1/2022 | Moghe | H04L 61/1511 |

(Continued)

*Primary Examiner* — Michael Won
(74) *Attorney, Agent, or Firm* — David R. Stevens; Stevens Law Group

(57) ABSTRACT

The present invention extends to methods, systems, and computer program products for automating DevOps toolchains. A user registers with a platform provider through a user interface that provides a unified self-service portal. Subsequently, the user can login to a platform configuration system to access a user landing page and/or dashboard. The user can select DevOps platform tools to be installed and enter configuration information. When the user is satisfied with selected DevOps platform tools and entered configuration, the user can select a "confirm" user-interface control (e.g., a button). In response, the selected DevOps tools are installed (with a relatively high level of automation) as DevOps platform. The user can also change DevOps platforms through the user interface (also with a relatively high level of automation), including migrating, deleting, and upgrading DevOps tools.

20 Claims, 16 Drawing Sheets

(56) References Cited

U.S. PATENT DOCUMENTS

| | | | |
|---|---|---|---|
| 2022/0091854 A1* | 3/2022 | Chivukula | H04L 67/36 |
| 2022/0091855 A1* | 3/2022 | Chivukula | G06F 9/4451 |
| 2022/0091856 A1* | 3/2022 | Chivukula | G06F 9/4451 |
| 2022/0091857 A1* | 3/2022 | Chivukula | H04L 67/306 |
| 2022/0091858 A1* | 3/2022 | Chivukula | H04L 63/0272 |

* cited by examiner

DEVOPS TOOLCHAIN AUTOMATION

RELATED APPLICATION

This application claims the benefit of U.S. Provisional Application Ser. No. 63/080,557 entitled "DevOps Toolchain Automation" and filed Sep. 18, 2020, which is hereby incorporated herein by reference in its entirety.

TECHNICAL FIELD

The present disclosure relates generally to DevOps. Aspects include automating DevOps toolchains.

BACKGROUND

DevOps represents a change in IT culture, focusing on rapid software and information technology service delivery through the adoption of agile, lean practices in the context of a system-oriented approach. DevOps emphasizes people (and culture), and it seeks to improve collaboration between operations and development teams. DevOps implementations utilize technology—especially automation tools that can leverage an increasingly programmable and dynamic infrastructure from a life cycle perspective. As such, DevOps can be utilized to shorten systems development lifecycle, improve the ability to provide continuous software delivery and help improve quality and security posture.

In general, a platform is an environment in which program code is executed. The environment can include hardware, operating system, associated programming interfaces, and other underlying software. With respect to DevOps, a DevOps platform provides an environment for creating and executing DevOps pipelines. A DevOps pipeline can include a set or combination of interconnected tools, also referred to as a "toolchain", that aids in the delivery, development, and management of digital resources (e.g., software) throughout the development life cycle. DevOps tools can fit into one or more categories supporting DevOps initiatives, such as, for example, plan, create, verify, package, test, release, configure, monitor, validate, version control, and security.

Appropriately configured and executed DevOps platforms and pipelines add some level of automation to digital resource (e.g., software) development and deployment, increasing agility. However, configuring and executing DevOps platforms and pipelines often includes many manual processes and can require both significant time (e.g., weeks and potentially even months) and human resources to complete. For example, DevOps platform configuration can include manually provisioning and allocating various hardware, network, and storage resources from a cloud provider. DevOps pipeline creation and execution can include manually managing tool interactions with platform resources and between various tools. In some aspects, human resources are expended to generate "glue code" (e.g., custom code, custom scripts and manual integration) that connects and promotes appropriate interoperation between different tools in a pipeline/toolchain.

Further, many platform and pipeline environments/providers restrict platforms to prescribed resource configurations and/or functionality, limit flexibility by preventing customers from selecting their own choice of tools, and do not offer out of the box or native integration to the toolchain to customers.

BRIEF DESCRIPTION OF THE DRAWINGS

The specific features, aspects and advantages of the present invention will become better understood with regard to the following description and accompanying drawings where.

DETAILED DESCRIPTION

Figure 1:
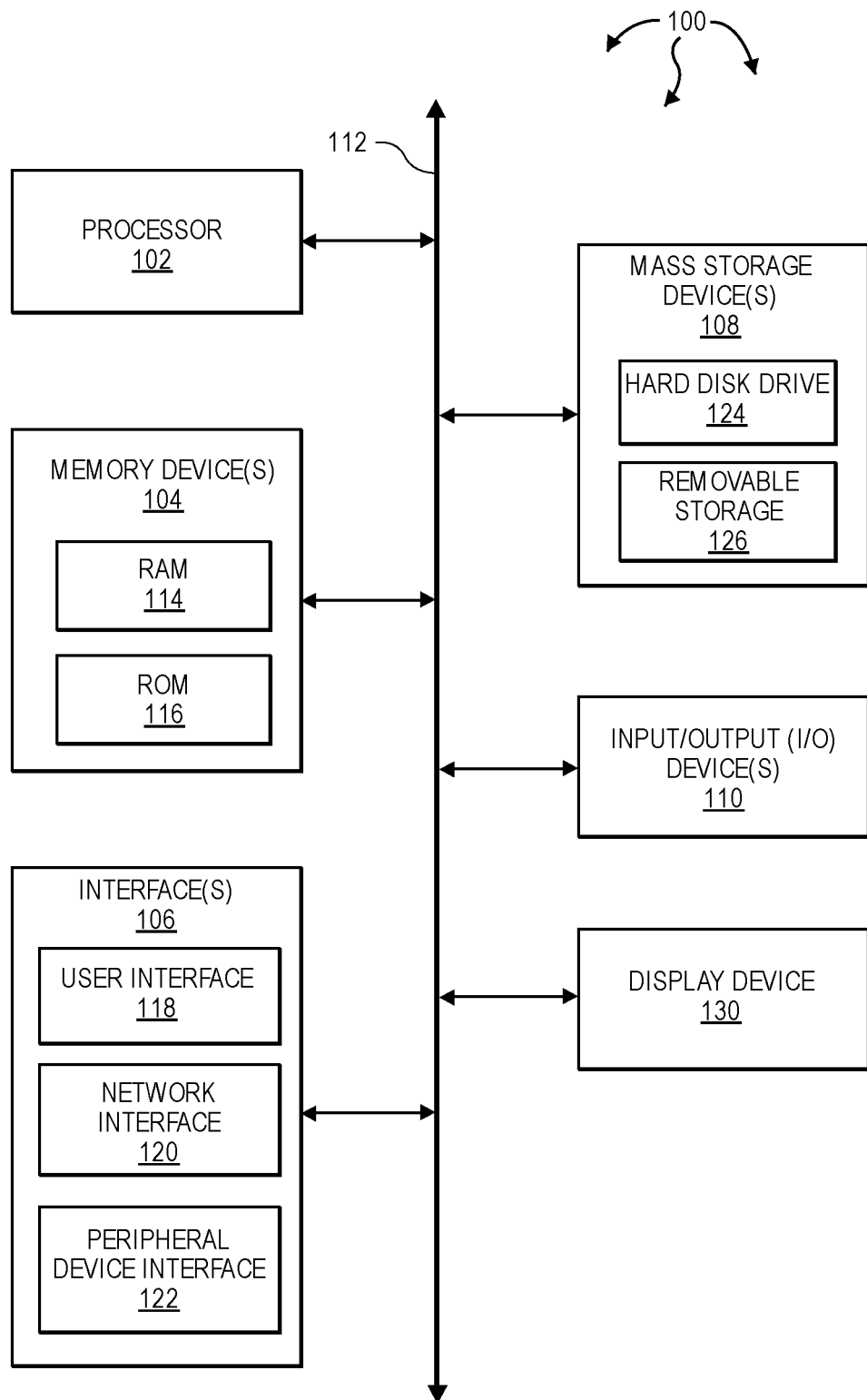
FIG. 1 illustrates an example block diagram of a computing device

The present invention extends to methods, systems, and computer program products for automating development and operations toolchains, configuring development and operations platforms, and handling end to end management of DevOps platforms and operations. Aspects including configuration, Lifecycle management of tools and platform (provisioning, migrating, upgrading, and deleting tools), API integration, and tool registry of overall DevOps platform.

Aspects of the invention include a DevOps toolchain platform that helps customers orchestrates automation of touchpoints information, integration between DevOps tools, data flows speeds the movement of releases through the toolchain while reducing configuration errors, defects, infrastructure setup, and configuration. DevOps toolchain automation allows customers to select tools that can be used at each stage and provides a one click deploy option to deploy the choice of the customer tools.

DevOps continuous orchestration as a platform can be used to assist with DevOps tool collection management, integrate DevOps tools seamlessly with plug and play architecture, automate workflows with drag and drop options, aggregate and contextualize logs and provide continuous insights across DevOps environments. As such, DevOps continuous orchestration can provide business value, including faster software delivery, improved agility, doing more with less, improved visibility, and enhanced predictive capabilities.

A DevOps Continuous Orchestration platform can help users automate integration and management of pipelines/workflows, across the DevOps environment and accelerate the overall software deployment, agility, and significantly reduce (if not eliminate) custom code requirements associated with building pipelines.

In one aspect, continuous orchestration is utilized to provide toolchain automation, including, per DevOps tool, one-click DevOps tool deployment, DevOps tool lifecycle management, (replace, migrate, upgrade and delete), DevOps tool registry, and DevOps tool configuration management, and DevOps tool job management. Accordingly, a DevOps tool chain platform and DevOps continuous orchestration can help improve security and compliance posture.

DevOps tool chain automation can also be integrated with declarative pipelines and unified insights and logs to provide more comprehensive solutions. DevOps continuous orchestration can provide a variety of benefits with respect to declarative pipelines. DevOps continuous orchestration can provide draft and drop options. Users can build the pipelines/workflows across various DevOps stages (code commit, software builds, security scans, vault integration, approvals, notifications, thresholds and gates, quality testing integrations, validation, integrating with change control and monitoring tools, deployment and providing a view of activity logs across every stage, etc.). Users can also leverage continuous integration to build pipelines across Software Development Life Cycle (SDLC), Kubernetes, Infrastructure as a code, multilanguage pipelines, Salesforce platform, Artificial intelligence, and Machine learning platform, ServiceNow, and workday platforms.

DevOps Continuous orchestration can also provide a variety of benefits with respect to unified insights and logs. A data transformer operates as a data normalization and serialization engine, converting raw data across a DevOps environment and tools. The data transformer can store normalized/serialized data in a data lake in accordance with a platform provider customized schema. DevOps continuous orchestration can then sequence, aggregate, and contextualize logs and provide an intuitive way of troubleshooting issues across a DevOps environment. As such, users can use unified insights and logs to capture historical data for compliance and audit purposes and provide a build manifest for root cause analysis. DevOps continuous orchestration can also process logs and leverage a Key Performance Indicator (KPI) framework. DevOps continuous integration can provide an intelligent dashboard across any of a number of (e.g., 85+) KPI's and any of a number of different (e.g., six or more) dimensions (including (Planning, Development/pipelines, security, quality, operations, and source code) to the customers. The intelligent dashboard can help users make more informed decisions and do more with less.

Figure 2:
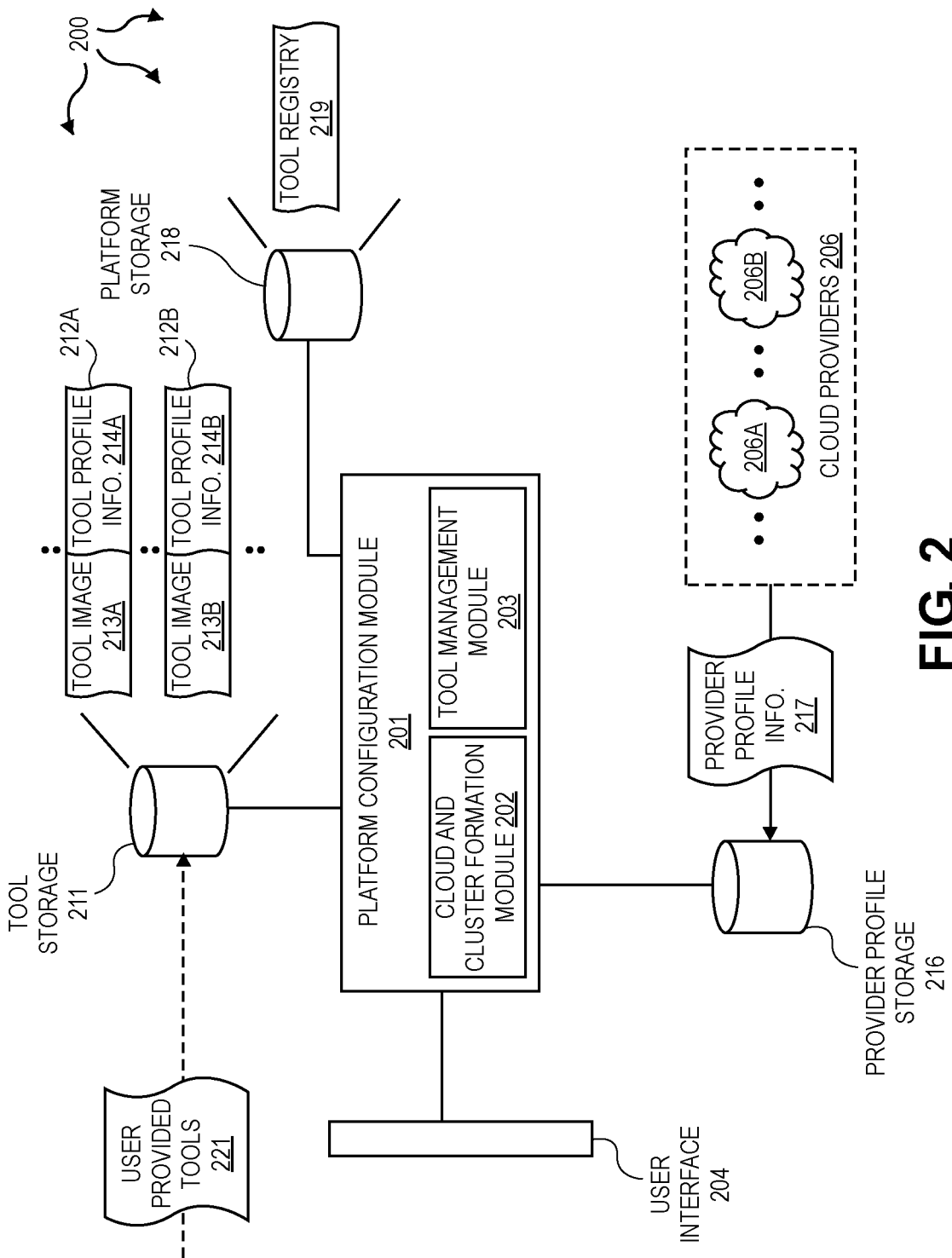
FIG. 2 illustrates an example computer architecture that facilitates configuring development and operations platforms.

Referring briefly to FIG. 2, a user can initially register with a platform provider (i.e., to use platform configuration module 201) through a user interface, such as, user interface 204, that provides a unified self-service port. Subsequently, the user can login to a platform configuration system, for example, entering credentials and/or using single sign on (SSO), to access a user landing page and/or dashboard. The user can select DevOps platform tools to be installed and enter configuration information. When the user is satisfied with selected tools and entered configuration, the user can select a "confirm" user-interface control (e.g., a button) to install the tools. Installation can include any of the described operations performed by platform configuration module 201, cloud and cluster formation module 202, and tool management module 203.

Aspects of the invention include providing a user tool catalog that includes one or more DevOps tools across a plurality of different DevOps functions. Users (customers) can select DevOps tools from the tool catalog for inclusion in a DevOps platform. Aspects of the invention also include automated orchestration and integration of DevOps tools, facilitating one click deployment. In response to a single user command, DevOps tools spanning different clouds, spanning one or more different clouds and on-premise resource, etc., can be orchestrated and integrated with increased automation. Aspects of the invention also include DevOps tool lifecycle management, including managing DevOps tool upgrades, DevOps tool deletions, DevOps tool rollbacks, and DevOps tool inventory.

As such, aspects of the invention enable users (customers) to choose and configure DevOps tool stacks to create DevOps platforms. With (significantly) reduced manual input, a user can install and use a DevOps platform. For example, a user can deploy one or multiple DevOps platforms in minutes using a "one click deploy" option. The user can be notified when the DevOps platform(s) is (are) ready for use.

Turning back to FIG. 1, FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices or cloud and DevOps tools, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory. Processor(s) 102 can be real or virtual and can be allocated from on-premise, cloud computing or any cloud provider.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory. Memory device(s) 104 can be real or virtual and can be allocated from on-premise, cloud computing or any cloud provider.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media. Mass storage device(s) 108 can be real or virtual and can be allocated from on-premise, cloud computing or any cloud provider.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like. I/O device(s) 110 can be real or virtual and can be allocated from on-premise, cloud computing or any cloud provider.

Display device 130 includes any type of device capable of displaying information to one or more users of computing device 100. Examples of display device 130 include a monitor, display terminal, video projection device, and the like. Display device 130 can be real or virtual and can be allocated from on-premise, cloud computing or any cloud provider.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122. Interface(s) 106 can be real or virtual and can be allocated from on-premise, cloud computing or any cloud provider.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth. Bus 112 can be real or virtual and can be allocated from on-premise, cloud computing or any cloud provider.

In this description and the following claims, DevOps is defined as software and information services delivery, including the adoption of agile, lean practices in the context of a system-oriented approach. DevOps can improve collaboration between operations and development teams. DevOps implementations can utilize technology, such as, for example, automation tools, that leverage an increasing programmable and dynamic infrastructure from a life cycle perspective. As such, DevOps can facilitate shortened systems development lifecycle and provide continuous delivery of developed digital resources (e.g., high quality software). DevOps is defined to include: Security and Operations (SecOps), Architecture and Operations (ArchOps), Testing and Operations (TestOps), Data and Operations (DataOps).

In this description and the following claims, a "DevOps toolchain" is defined as a set or combination of interconnected tools that aid in the delivery, development, and management of developed resources (e.g., software applications) throughout the development life cycle, as coordinated by an organization that uses DevOps practices. DevOps tools can be directed to one or more DevOps initiatives, such as, for example, plan, create, verify, package, release, configure, monitor, version control, etc.

In this description and the following claims, a "microservice architecture" (MSA) or "microservices" is a technique of developing software systems with a focus on building single-function modules with (e.g., well) defined interfaces and operations. Within a microservices architecture, multiple individual microservices can be loosely coupled to one another using lightweight protocols. Thus, an MSA can include a loosely coupled arrangement of decentralized services. Services in an MSA can communicate over a network using technology agnostic protocols (e.g., HyperText Transfer Protocol (HTTP), HTTPS (secure HTTP), APIs (Application Program Interfaces using REST, JSON, YAML, etc.) API gateway, SSL, TLS, etc.), can be independently deployable, and can be implemented using different programming languages, databases, operating environments.

Aspects of the invention include configuring and changing DevOps tools and DevOps tool chains in a MSA. For example, a DevOps toolchain can be developed and deployed independently of or in combination with one or more DevOps tools in a toolchain or techstack in any cloud provider with user choice.

In this description and the following claims, a "virtual private cloud" (or VPC) is defined as an on-demand configurable pool of shared computing resources allocated within a (e.g., public) cloud environment, providing a certain level of isolation between the different organizations using the resources. Isolation between one VPC user and other users of the same cloud can be achieved through allocation of a private IP subnet and a virtual communication construct per user. In a VPC, a Virtual Private Network (VPN) function can provide an organization remote access to its VPC resources.

Platform Architecture

FIG. 2 illustrates an example computer architecture 200 that facilitates configuring development and operations platforms. As depicted, computer architecture 200 includes platform configuration module 201, user interface 204, cloud providers 206, tool storage 211, provider profile storage 216, and platform storage 218. Platform configuration module 201 further includes cloud and cluster formation module 202 and toll management module 203. Cloud providers 206 includes a plurality of cloud providers including cloud providers 206A, 206B, etc.

In general, user interface 204 provides a unified self-service portal between users and platform configuration module 201. User interface 204 can include functionality facilitating registering with platform configuration module 201, logging into platform configuration module 201, submitting platform configuration commands to platform configuration module 201, receiving platform related operational information (e.g., logs, performance metrics, etc.) from platform configuration module, etc. Platform configuration commands can include commands related to and/or associated with deploying a DevOps platform, altering a DevOps platform, upgrading a DevOps platform, removing functionality from a DevOps platform, etc.

In general, platform configuration module 201 manages the configuration of DevOps platforms in accordance with user entered platform configuration commands. Cloud and cluster formation module 202 can form and manage clouds and clusters where DevOps tools are to be deployed (including forming and managing user VPCs). Tool management module 203 can deploy DevOps tools (e.g., as an independent tool or collection of one or more tools into a toolchain or techstack using microservices architecture) onto a formed cloud and cluster (e.g., a VPC) to configure a DevOps platform, manage DevOps tools deployed (e.g., using microservices architecture) in a DevOps platform, alter which DevOps tools are deployed (e.g., using microservices architecture) in a DevOps platform, upgrade DevOps tools deployed (e.g., using microservices architecture) in a DevOps platform, remove deployed functionality (e.g., DevOps tools deployed using microservices architecture) from a DevOps platform, etc. Tool management module 203 can connect and chain DevOps tools (e.g., using microservices architecture) to one another to facilitate (e.g., user desired) DevOps platform functionality. Tool management module 203 can also manage dependencies, sequences, and compatibility between deployed DevOps tools (e.g., using microservices architecture) in a DevOps platform.

Provider profile storage 216 is configured to store cloud provider profile information. For example, provider profile storage 216 can store provide profile information 217 for cloud providers 206, including cloud providers 206A, 206B, etc. Cloud and cluster formation module 201 can form and manage clouds and clusters that include cloud resources in accordance with provider profile information stored in provider profile storage 216. Users may also send on-premise profile information for user on-premise resources to platform configuration module 201. Cloud and cluster formation module 202 can form and manage clouds and clusters including user on-premise resources in accordance with on-premise profile information.

As such, cloud and cluster formation module 202 can form and manage clouds and clusters that span any combination of: public cloud resources (e.g., spanning one or more public clouds), private cloud resources (e.g., spanning one or more private clouds), user on-premise resources, etc., in accordance with appropriate (cloud and/or on-premise) profile information. For example, a cloud and cluster can be formed from: resources of cloud provider 206A, resources of cloud provider 206B, and user on-premise resources. Cloud and cluster formation module 202 can (re-)configure a cloud and/or cluster as appropriate to address: alterations to DevOps platforms, upgrades to DevOps platforms, removal of functionality from DevOps platforms, etc.

Tool storage 211 is configured to store tool images and corresponding tool profile information for DevOps tools. For example, tool storage 211 can store DevOps tool 212A including tool image 213A and tool profile information 214A, DevOps tool 212B including tool image 213B and tool profile information 214B, etc. In one aspect, a platform provider (e.g., a corporation) controls platform configuration module 201. The platform provider can make various DevOps tools available to any users of platform configuration module 201. The platform provider can store the available DevOps tools at tool storage 211. Platform configuration module 201 can provide a catalog of available tools to registered users through user interface 204.

In another aspect, registered users may provide their own DevOps tools for deployment into a DevOps platform. User provided DevOps tools can also be stored at tool storage 211. For example, user provided tools 221 can be stored at tool storage 211. Users may or may not share their tools with other users.

As such, tool management module 203 can deploy and connect and chain (user and/or platform) DevOps tools spanning any combination of: public cloud resources (e.g., spanning one or more public clouds), private cloud resources (e.g., spanning one or more private clouds), user on-premise resources, etc. Tool management module 203 can also manage dependencies, sequences, and compatibility between (user and/or platform) DevOps tools spanning any combination of: public cloud resources (e.g., spanning one or more public clouds), private cloud resources (e.g., spanning one or more private clouds), user on-premise resources, etc.

DevOps tools can be selected from among any of a variety of categories including, but not limited to: configuration management, continuous integration, source control, build tools, containerization, continuous verification, quality and testing, monitoring, logging, security, static code analysis, dynamic code scanning, threat vulnerability management, container scanning, or continuous deployment and continuous delivery.

Platform storage stores tool registry 219. When a DevOps platform is deployed, corresponding platform information can be stored in tool registry 219. When a user subsequently requests DevOps platform alteration, upgrade, functionality removal, etc., tool management module 203 can refer to and consider the corresponding platform information when implementing the DevOps platform alteration, upgrade, functionality removal, etc.

Platform Deployment

Figure 3:
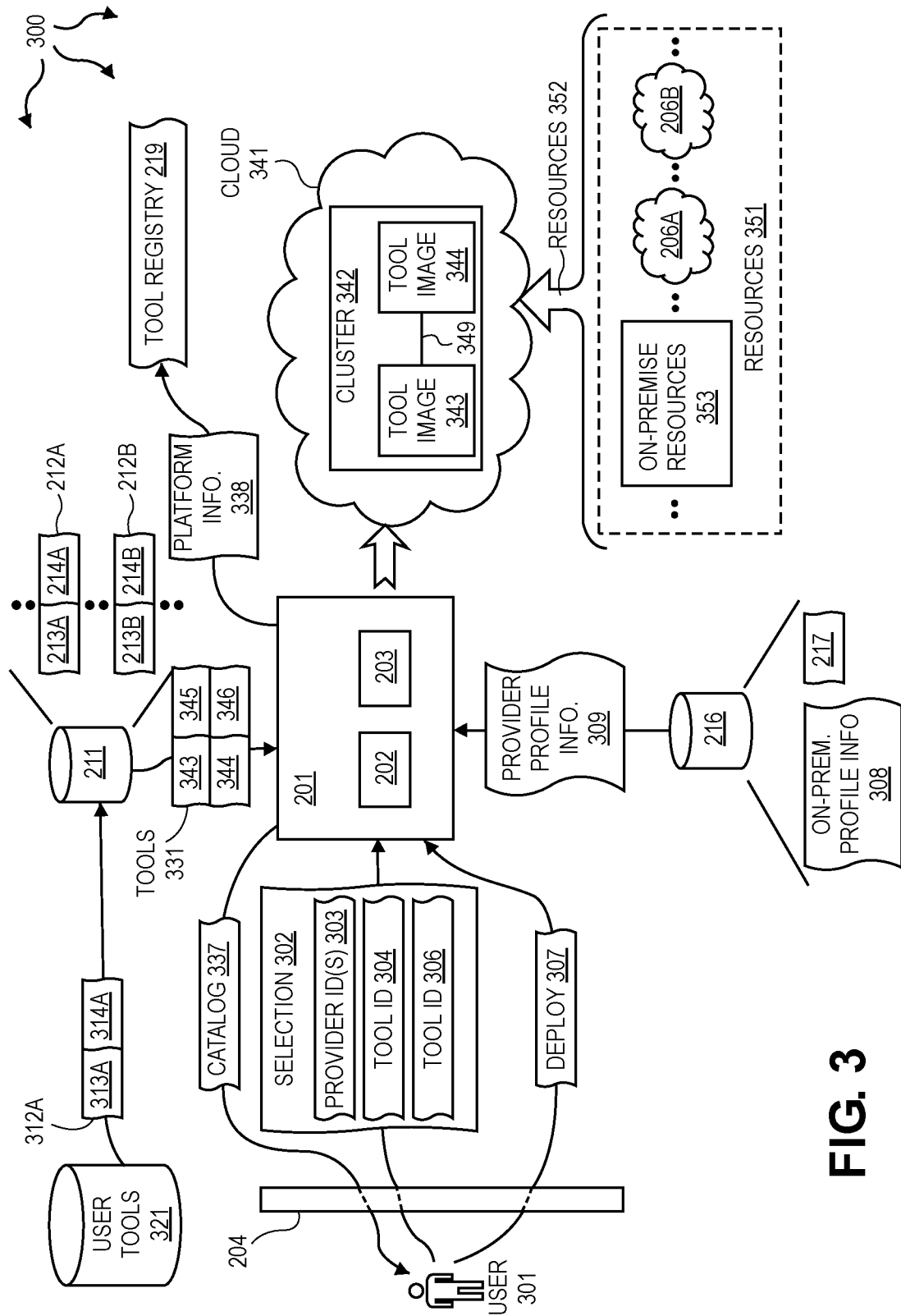
FIG. 3 illustrates an example computer architecture that facilitates deploying a development and operations platform.

FIG. 3 illustrates an example computer architecture 300 that facilitates deploying a development and operations platform. As depicted, computer architecture 300 includes user tools 321. User tools 321 can store one or more DevOps tools associated with user 301, including DevOps tool 312A comprised of tool image 313A and tool profile information 313B. User 321 can store tool DevOps 312A in tool storage 211a or make tool DevOps 312A otherwise available to platform configuration module 201. User 301 can also store on-premise profile information 308 in provider profile storage 216. On-premise profile information 308 can contain profile information corresponding to on-premise resources 353 (which may be on-premise resources of user 301).

Platform configuration module 201 can provide catalog 337 to user 301 through user interface 204. Catalog 337 can include a listing of platform DevOps tools provided by a platform provider (e.g., an entity that is in control of platform configuration module 201) and that are available to user 301 (e.g., stored in tool storage 211). For example, catalog 337 can list DevOps tools 212A, 212B, etc.

Figure 4:
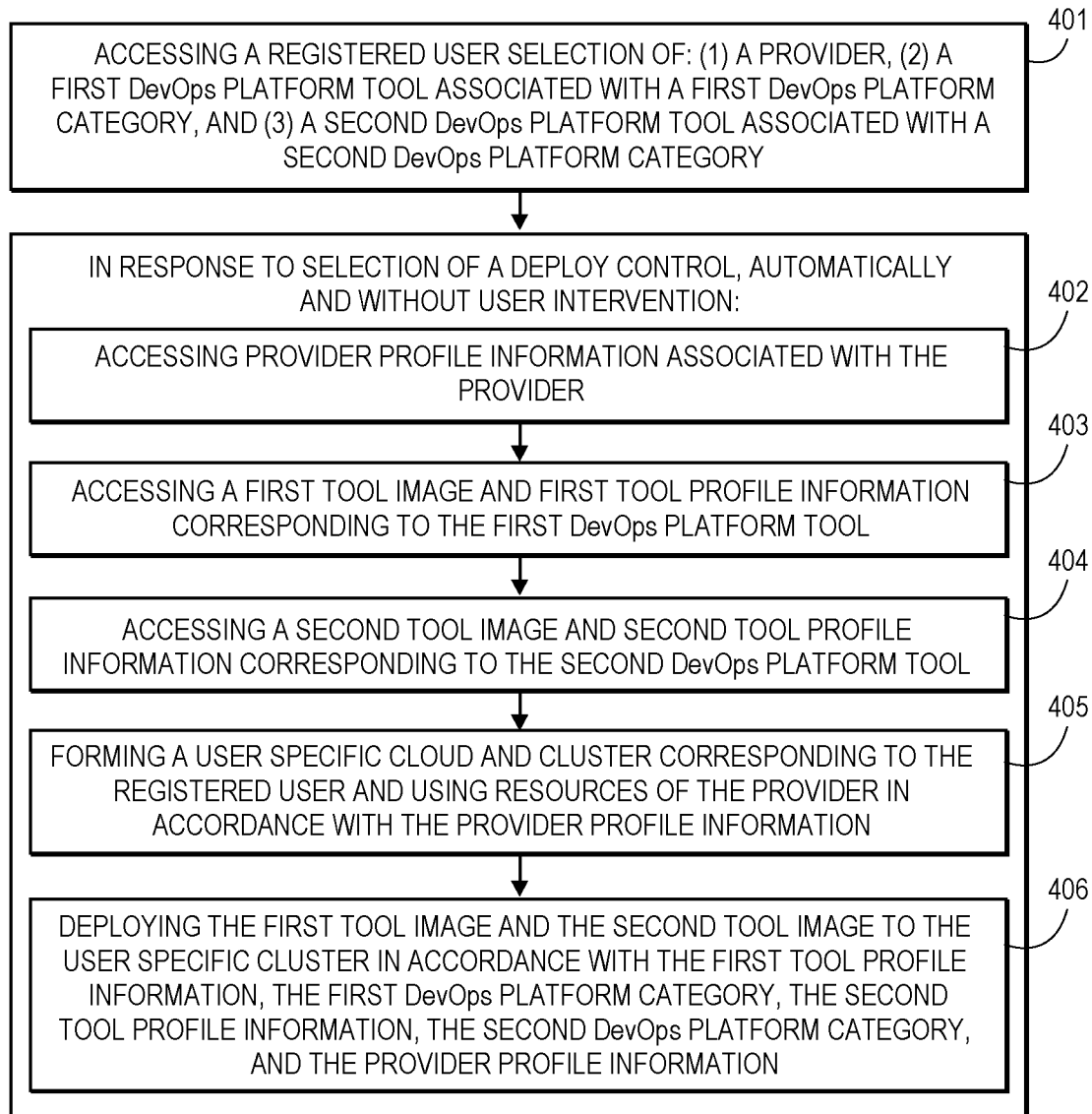
FIG. 4 illustrates a flow chart of an example method for deploying a development and operations platform.

FIG. 4 illustrates a flow chart of an example method 400 for deploying a development and operations platform. Method 400 will be described with respect to the components and data in computer architecture 300.

Method 400 includes accessing a registered user selection of: (1) a provider, (2) a first DevOps platform tool associated with a first DevOps platform category, and (3) a second DevOps platform tool associated with a second DevOps platform category. (401). For example, user 301 can submit selection 302 to platform configuration module 201 through user interface 204. Platform configuration module 201 can receive selection 302 from user 301. As depicted, selection 302 includes provider ID(s) 303, tool ID 304, and tool ID 306.

Provider ID(s) 303 can include identifiers for one or more of on-premise resources 353, cloud provider 206A, cloud provider 206B, etc. Tool ID 304 can identify a first DevOps tool and tool ID 306 can identify a second DevOps tool. In one aspect, both tool ID 304 and tool ID 306 identify platform DevOps tools (e.g., DevOps tools 212A and 212B), potentially listed in catalog 337. In another aspect, tool ID 304 identifies a platform DevOps tool (e.g., DevOps tool 212A) and tool ID 306 identifies a user DevOps tool (e.g., DevOps tool 312A) or vice versa. In a further aspect, both tool ID 304 and tool ID 306 identify user DevOps tools.

Tool IDs 304 and 306 can identify DevOps tools in categories selected from among, but not limited to: configuration management, continuous integration, source control, build tools, containerization, continuous verification, quality and testing, monitoring, logging, security, static code analysis, dynamic code scanning, threat vulnerability management, container scanning, or continuous deployment and continuous delivery. In aspect, tool ID 304 identifies a DevOps tool in one category and tool ID 306 identifies a DevOps tool in another different category.

Thus, selection 302 can provide platform configuration module 201 with relevant information for deploying a DevOps platform. Subsequent to submitting selection 302, user 301 can submit deploy command 307 to platform configuration module 201 through user interface 204. Platform configuration module 201 can receive deploy command 307 from user 301.

Method 400 includes, in response to selection of a deploy control (e.g., "one click deploy"), automatically and without user intervention, accessing provider profile information associated with the provider (402). For example, in response to receiving deploy command 307, cloud and cluster formation module 202 can access provider profile information 309. Provider profile information 309 can be a subset of on-premise profile information 308 and provider profile information 217 and can include profile information for any providers identified by provider ID(s) 301. In one aspect, provider profile information 309 includes a subset of profile information 217 corresponding to cloud providers 206A and 206B. In another aspect, provider profile information 219 includes on-premise profile information 308 and a subset of profile information 217 corresponding to at least one of cloud providers 206A and 206B.

Method 400 includes, in response to selection of the deploy control (e.g., "one click deploy"), automatically and without user intervention, accessing a first tool image and first tool profile information corresponding to the first DevOps platform tool (403). Method 400 includes, in response to selection of the deploy control (e.g., "one click deploy"), automatically and without user intervention, accessing a second tool image and second tool profile information corresponding to the second DevOps platform tool (404). For example, in response to receiving deploy command 307, tool management module 203 can access DevOps tools 331, including tool image 343 and corresponding tool profile information 345 and tool image 344 and corresponding tool profile information 346.

In one aspect, tool image 343 and corresponding tool profile information 345 are tool image tool image 213A and tool profile information 214A corresponding to DevOps tool 212A. In this same aspect, tool image 344 and corresponding tool profile information 346 are tool image tool image 213B and tool profile information 214B corresponding to DevOps tool 212A. That is, both the first and the second DevOps tools are platform DevOps tools.

In another aspect, tool image 343 and corresponding tool profile information 345 are tool image 313A and tool profile information 314A corresponding to DevOps tool 312A. In this same other aspect, tool image 344 and corresponding tool profile information 346 are one of: (a) tool image 213A and tool profile information 214A corresponding to tool DevOps 212A or (b) tool image 213B and tool profile information 214B corresponding to DevOps tool 212B. That is, the first DevOps tool is a user DevOps tool and the second DevOps tool is a platform DevOps tool.

Method 400 includes, in response to selection of the deploy control (e.g., "one click deploy"), automatically and without user intervention, forming a user specific cloud and cluster corresponding to the registered user and using resources of the provider in accordance with the provider profile information (405). For example, in response to deploy command 307, cloud and cluster formation module 202 can form cloud 341 and cluster 342 corresponding to user 301. Cloud and cluster formation module 202 can form cloud 341 and cluster 342 using resources 352 in accordance with provider profile information 309. Resources 352 can include resources from one or more of: on-premise resources 353, cloud provider 206A, cloud provider 206B, as defined in provider profile information 309. As such, resources used to form cloud 341 and/or cluster 342 can span any combination of on-premise resources 353, cloud provider 206A, cloud provider 206B, etc.

In one aspect, cloud 341 and/or cluster 342 spans resources of multiple different cloud providers, for example, cloud providers 306A and 306B. In another aspect, cloud 341 and/or cluster 342 spans resources of at least one cloud provider, for example, cloud provider 306A or cloud provider 306B, and on-premise resources, for example, on-premise resources 353.

In one aspect, cloud 341 is formed as a VPC.

Method 400 in response to selection of the deploy control (e.g., "one click deploy"), automatically and without user intervention, deploying the first tool image and the second tool image to the user specific cluster in accordance with the first tool profile information, the first DevOps platform category, the second tool profile information, the second DevOps platform category, and the provider profile information (406). For example, tool management module 203 can deploy tool image 343 and tool image 344 to cluster 342 in accordance with relevant tool profile information based on the categories of tools 331. Tool image 343 and tool image 344 may be deployed as microservices.

In one aspect, tool image 343 is tool image 213A and is deployed in accordance with tool profile information 214A. In this same aspect, tool image 344 is tool image 213B and is deployed in accordance with tool profile information 214B. That is, two platform DevOps tools are deployed (e.g., to a user cloud and/or cluster potentially spanning resources of multiple different clouds and/or potentially spanning on-premise resources and resources of a cloud).

In another aspect, tool image 343 is tool image 313A and is deployed in accordance with tool profile information 314A. In this same other aspect, tool image 344 is one of: tool image 213A or tool image 213B and is deployed in accordance with one of: tool profile information 214A or tool profile information 214B respectively. That is, one user DevOps platform tool is deployed and one platform DevOps tool is deployed (e.g., to a user cloud and/or cluster potentially spanning resources of multiple different clouds and/or potentially spanning on-premise resources and resources of a cloud).

Tool management module 203 can determine one or more of: dependencies, sequence, and compatibility between tool image 343 and tool image 344. Tool management module 203 can chain and connect 349 tool image 343 and tool image 344 to one another in accordance with the determined one or more of: the dependencies, the sequence, and the compatibility.

Tool management module 203 can similarly deploy additional tool images to cloud 341/cluster 342 in accordance with appropriate profile information. Tool management module 203 can further determine any dependencies, sequence, and compatibility among additional tool images and between any of the additional tool images and tool images 343 and 344. Tool management module 203 can chain and connect any of the additional tool images to one another and/or to tool images 343 and 344 in accordance with the further determined dependencies, sequence, and compatibility.

Tool management module 203 can also allocate separate and dedicated database resources and log aggregation resources to cloud 341/cluster 342 (or to a corresponding VPC).

Platform configuration module 201 can store platform information 338 in tool registry 219. Platform information 338 can indicate the configuration of tool images deployed to cloud 341/cluster 342 (i.e., deployed to the "platform"). Platform information 338 can indicate chained and connected tool images as well as dependencies, sequence, and compatibility between deployed tool images deployed to cloud 341/cluster 342. Platform information 338 can also include relevant tool profile information and provider profile information for resources allocated to and tools deployed to cloud 341/cluster 342. Platform information 338 can also include security group settings, storage settings, network configuration settings, and load balancer settings corresponding to cloud 341/cluster 342.

Platform Alteration

Figure 5:
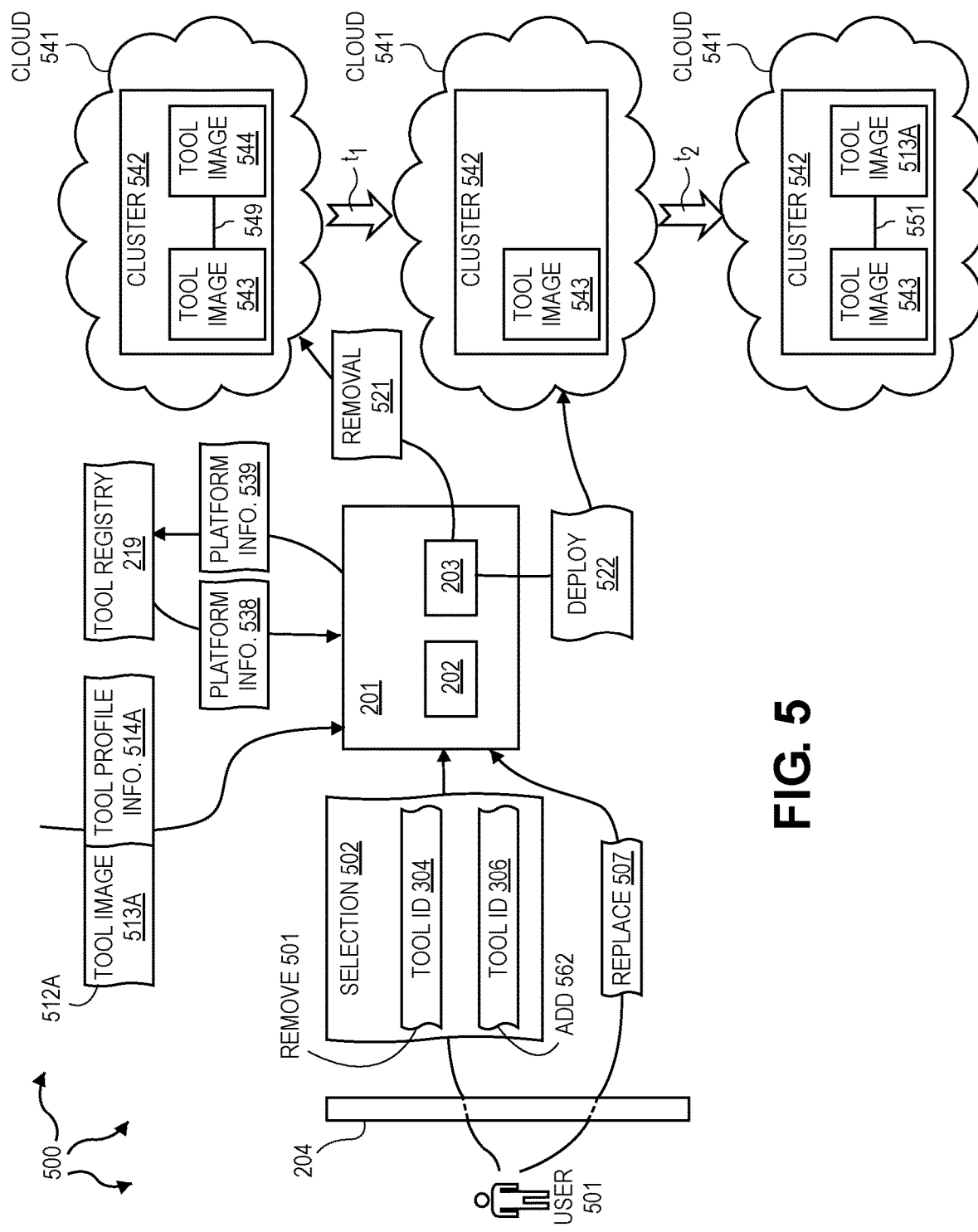
FIG. 5 illustrates an example computer architecture that facilitates altering a development and operations platform.

FIG. 5 illustrates an example computer architecture 500 that facilitates altering a development and operations platform. As depicted in computer architecture 500, tool image 543 and tool image 544 are deployed (possibly as microservices) into cloud 541/cluster 542 (which may be a VPC). Cloud 541/cluster 542 can include cloud provider resources and/or on-premise resources. In one aspect, resources of cloud 541/cluster 542 span one or more cloud providers and/or on-premise resources. Tool images 543 and 544 can be associated with DevOps tools in any categories selected from among: configuration management, continuous integration, source control, build tools, containerization, continuous verification, quality and testing, monitoring, logging, security, static code analysis, dynamic code scanning, threat vulnerability management, container scanning, or continuous deployment and continuous delivery.

Platform configuration module 201 can have previously stored platform information 538 for cloud 541/cluster 542 (i.e., the "platform") in tool registry 219. Platform information 538 can indicate chained and connected tool images as well as dependencies, sequence, and compatibility between deployed tool images in cloud 541/cluster 542. Platform information 538 can also include relevant tool profile information and provider profile information for resources allocated to and tools deployed to cloud 541/cluster 542. Platform information 538 can also include security group settings, storage settings, network configuration settings, and load balancer settings corresponding to cloud 541/cluster 542.

Figure 6:
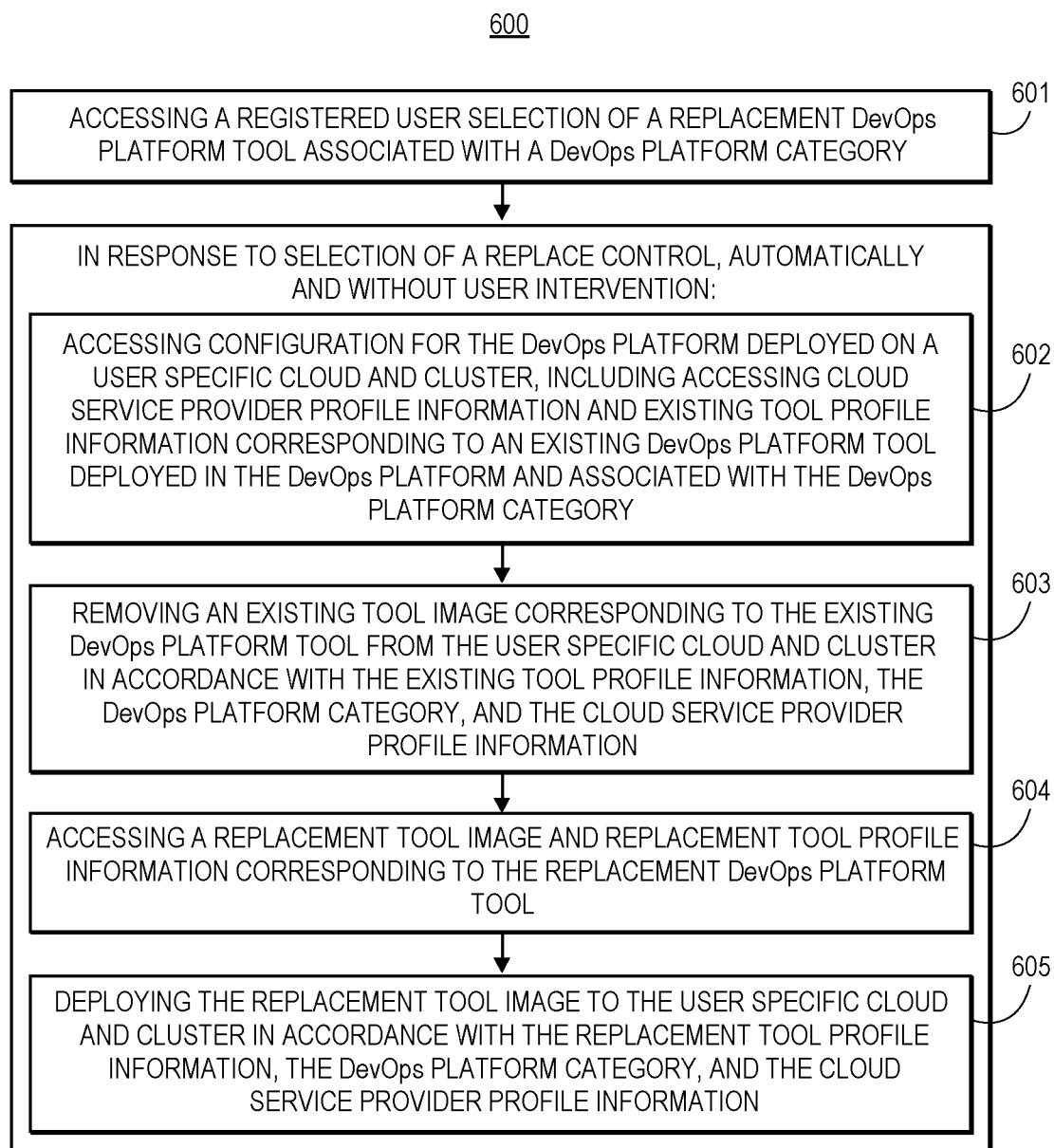
FIG. 6 illustrates a flow chart of an example method for altering a development and operations platform.

FIG. 6 illustrates a flow chart of an example method 600 for altering a development and operations platform. Method 600 will be described with respect to the components and data in computer architecture 500.

Method 600 includes accessing a registered user selection of a replacement DevOps platform tool associated with a DevOps platform category (601). For example, user 501 can submit selection 502 to platform configuration module 201 through user interface 204. Platform configuration module 201 can receive selection 502 from user 501. As depicted, selection 502 includes remove 561 of tool ID 504 and add 563 of tool ID 505. Tool ID 504 can correspond to tool image 544 and tool ID 505 can correspond to tool image 513A. In one aspect, DevOps platform tool 512A is selected out of a platform provider catalog.

Tool IDs 504 and 505 can identify DevOps tools in categories selected from among, but not limited to: configuration management, continuous integration, source control, build tools, containerization, continuous verification, quality and testing, monitoring, logging, security, static code analysis, dynamic code scanning, threat vulnerability management, container scanning, or continuous deployment and continuous delivery.

In aspect, tool IDs 504 and 505 identify DevOps tools in the same category. However, tool image 543 can be associated with a DevOps tool in a different category.

Thus, selection 502 can provide platform configuration module 201 with relevant information for replacing tool image 544 with tool image 513A in cloud 541/cluster 542. Subsequent to submitting selection 502, user 501 can submit replace command 507 to platform configuration module 201 through user interface 204. Platform configuration module 201 can receive replace command 507 from user 501.

Method 600 includes, in response to selection of a replace control, automatically and without user intervention, accessing configuration for the DevOps platform deployed on a user specific cloud and cluster, including accessing cloud service provider profile information and existing tool profile information corresponding to an existing DevOps platform tool deployed in the DevOps platform and associated with the DevOps platform category (602). For example, platform configuration module 201 can access platform information 538 from tool registry 219. As described, platform information 538 can indicate chained and connected tool images as well as dependencies, sequence, and compatibility between deployed tool images in cloud 541/cluster 542. Platform information 538 can also include relevant tool profile information and provider profile information for resources allocated to and tools deployed to cloud 541/cluster 542. As such, platform information 538 can include information about chain and connection 549 and information about dependencies, sequence, and compatibility between tool image 543 and tool image 544.

Method 600 includes, in response to selection of a replace control, automatically and without user intervention, removing an existing tool image corresponding to the existing DevOps platform tool from the user specific cloud and cluster in accordance with the existing tool profile information, the DevOps platform category, and the cloud service provider profile information (603). For example, tool management module 203 can implement removal 521 to remove tool image 544 (possibly a microservice) from cloud 541/cluster 542 in accordance with platform information 538 and the category associated with the DevOps platform tool corresponding to tool image 544.

In one aspect, tool image 544 is removed from on-premise resources associated with user 501. In another aspect, tool image 544 is removed from resources of a cloud provider.

Thus, at time $t_1$, cloud 541/cluster 542 can transition to a configuration with tool image 544 removed.

Method 600 includes, in response to selection of a replace control, automatically and without user intervention, accessing a replacement tool image and replacement tool profile information corresponding to the replacement DevOps platform tool (604). For example, tool management module 203 can access tool image 513A and tool profile information 513B corresponding to DevOps platform tool 512A (e.g., from tool storage 211 or from user 501).

Method 600 includes, in response to selection of a replace control, automatically and without user intervention, deploying the replacement tool image to the user specific cloud and cluster in accordance with the replacement tool profile information, the DevOps platform category, and the cloud service provider profile information (605). For example, tool management module 203 can deploy 522 tool image 513A (possibly as a microservice) into cloud 541/cluster 542. Tool management module 203 can deploy tool image 513A in accordance with tool profile information 514A, the category associated with DevOps platform tool 512A, and platform information 538.

In one aspect, tool image 513A is deployed to on-premise resources associated with user 501. In another aspect, tool image 513A is deployed to resources of a cloud provider.

When appropriate, tool images can be removed from and/or deployed to clouds/clusters including resources that span multiple cloud service providers and/or that span a cloud service provider and on-premise resources. Cloud and cluster configuration module 202 can implement cloud and/or cluster changes to accommodate replacement tool images. For example, cloud and cluster configuration module 202 can adjust the source, amount, etc. of a resource to accommodate differences in resource consumption between tool image 544 and tool image 513A.

Thus, at time $t_2$, cloud 541/cluster 542 can transition to a configuration that includes tool image 513A.

Tool management module 203 can determine one or more of: dependencies, sequence, and compatibility between tool image 543 and tool image 513A. Tool management module 203 can chain and connect 551 tool image 543 and tool image 513A to one another in accordance with the determined one or more of: the dependencies, the sequence, and the compatibility.

Platform configuration module 201 can store platform information 539 in tool registry 219 after time $t_2$. Platform information 539 can indicate the configuration of tool images deployed to cloud 541/cluster 542 (i.e., deployed to the "platform"). Platform information 539 can indicate chained and connected tool images as well as dependencies, sequence, and compatibility between deployed tool images deployed to cloud 541/cluster 542. Platform information 539 can also include relevant tool profile information and provider profile information for resources allocated to and tools deployed to cloud 541/cluster 542.

Users of platform configuration module 201 (e.g., user 301, 501, etc.) can register for automatic DevOps platform tool upgrades through user interface 204. When a user registers for automatic updates in association with a platform, an indication of the registration can be stored along with corresponding platform information in tool registry 219. From time to time, at specified intervals, or in accordance with an upgrade schedule, platform configuration model 201 can check various locations (e.g., tool storage 211, user stores, other network locations, developer web sites, etc.) for upgraded versions of DevOps platform tools. Alternately or in combination, platform configuration module 201 can register with other modules (e.g., developer update services) to be notified when DevOps platform tool upgrades are available. When an upgraded version of a DevOps platform tool is detected, platform configuration module 201 can replace a current version of the DevOps platform tool with the upgraded version.

In one aspect, tool registry 219 automatically discovers and updates DevOps tools from cloud or on-prem environments and registers them in tool registry 219. Tool registry 219 has multiple use cases. For example, using tool registry 219, a user can manage tools and configuration across various DevOps functions and also for compliance, security, audit and licensing of the tools on a real time basi. Tool registry 219 can also register tool utilization, allowing customers to optimize/consolidate and minimize the licensing and management of tool cost and to also improve the security and compliance posture (e.g., deleting unwanted tools).

Platform Upgrade

Figure 7:
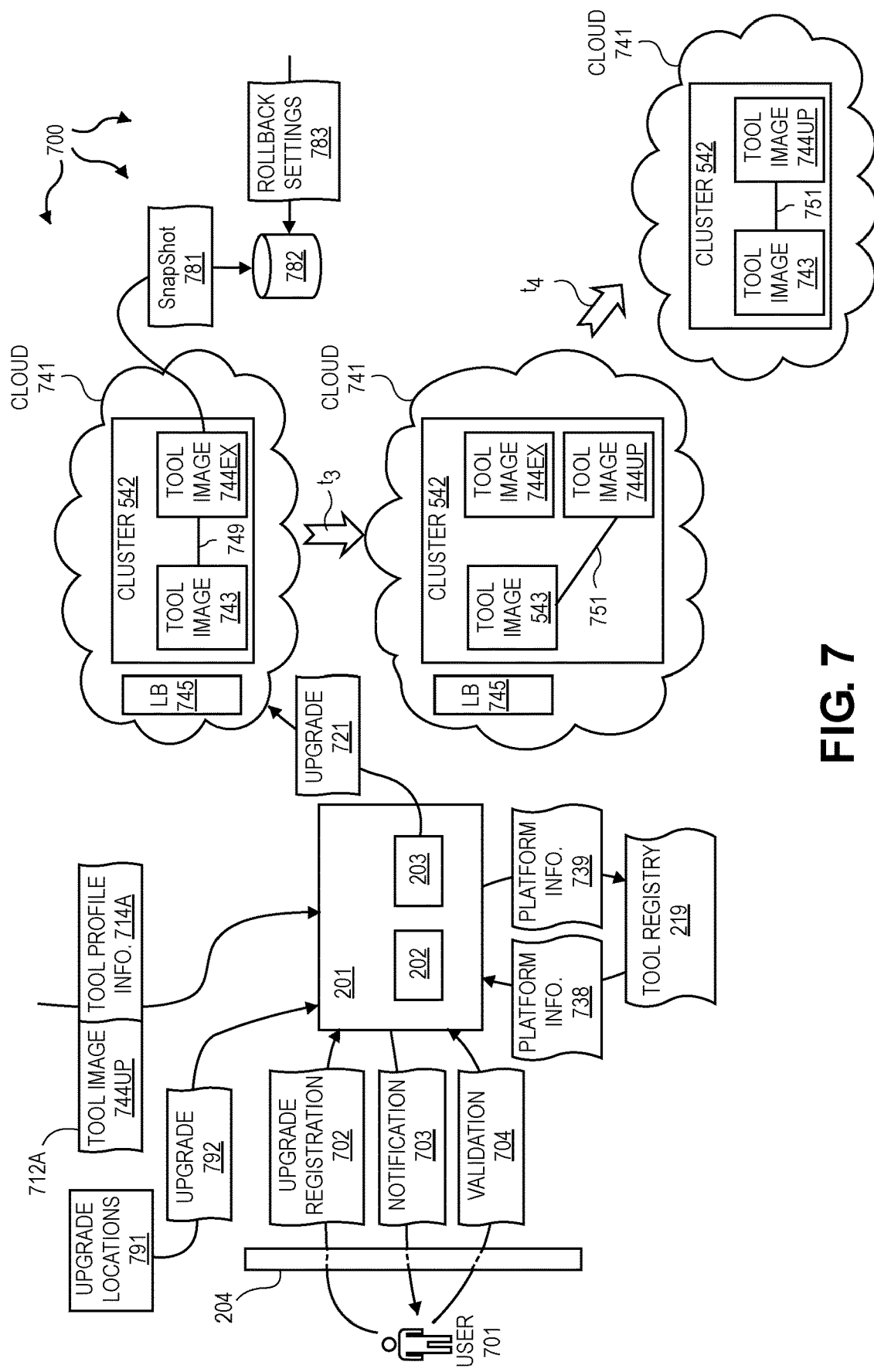
FIG. 7 illustrates an example computer architecture that facilitates upgrading a development and operations platform.

FIG. 7 illustrates an example computer architecture 700 that facilitates upgrading a development and operations platform. During an upgrade, configurations and data associated with a current version of a DevOps platform tool can remain intact. The configurations and data can be placed back after upgrading to an upgraded version of the DevOps tool.

As depicted in computer architecture 700, tool image 743 and tool image 744 existing are deployed (possibly as microservices) into cloud 741/cluster 742 (which may be a VPC). Cloud 741/cluster 742 can include cloud provider resources and/or on-premise resources. In one aspect, resources of cloud 741/cluster 742 span one or more cloud providers and/or on-premise resources. Tool images 743 and 744 existing can be associated with DevOps tools in any categories selected from among: configuration management, continuous integration, source control, build tools, containerization, continuous verification, quality and testing, monitoring, logging, security, static code analysis, dynamic code scanning, threat vulnerability management, container scanning, or continuous deployment and continuous delivery.

Platform configuration module 201 can have previously stored platform information 738 for cloud 741/cluster 742 (i.e., the "platform") in tool registry 219. Platform information 738 can indicate chained and connected tool images as well as dependencies, sequence, and compatibility between deployed tool images in cloud 741/cluster 742. Platform information 738 can also include relevant tool profile information and provider profile information for resources allocated to and tools deployed to cloud 741/cluster 742. Platform information 738 can also include security group settings, storage settings, network configuration settings, and load balancer settings corresponding to cloud 741/cluster 742.

Load balancer 745 can control how workloads directed to cloud/cluster 742 are balanced. Initially, load balancer 745 can direct output from tool image 743 to tool image 744 existing.

User 701 can send upgrade registration 702 to platform configuration module 201 through user interface 204. Platform configuration module 201 can receive upgrade registration 702 from user 701. In response, platform configuration module 201 can update platform information 738 to indicate a registration for automatic upgrades for tool images deployed in cloud 741/cluster 742.

Figure 8:
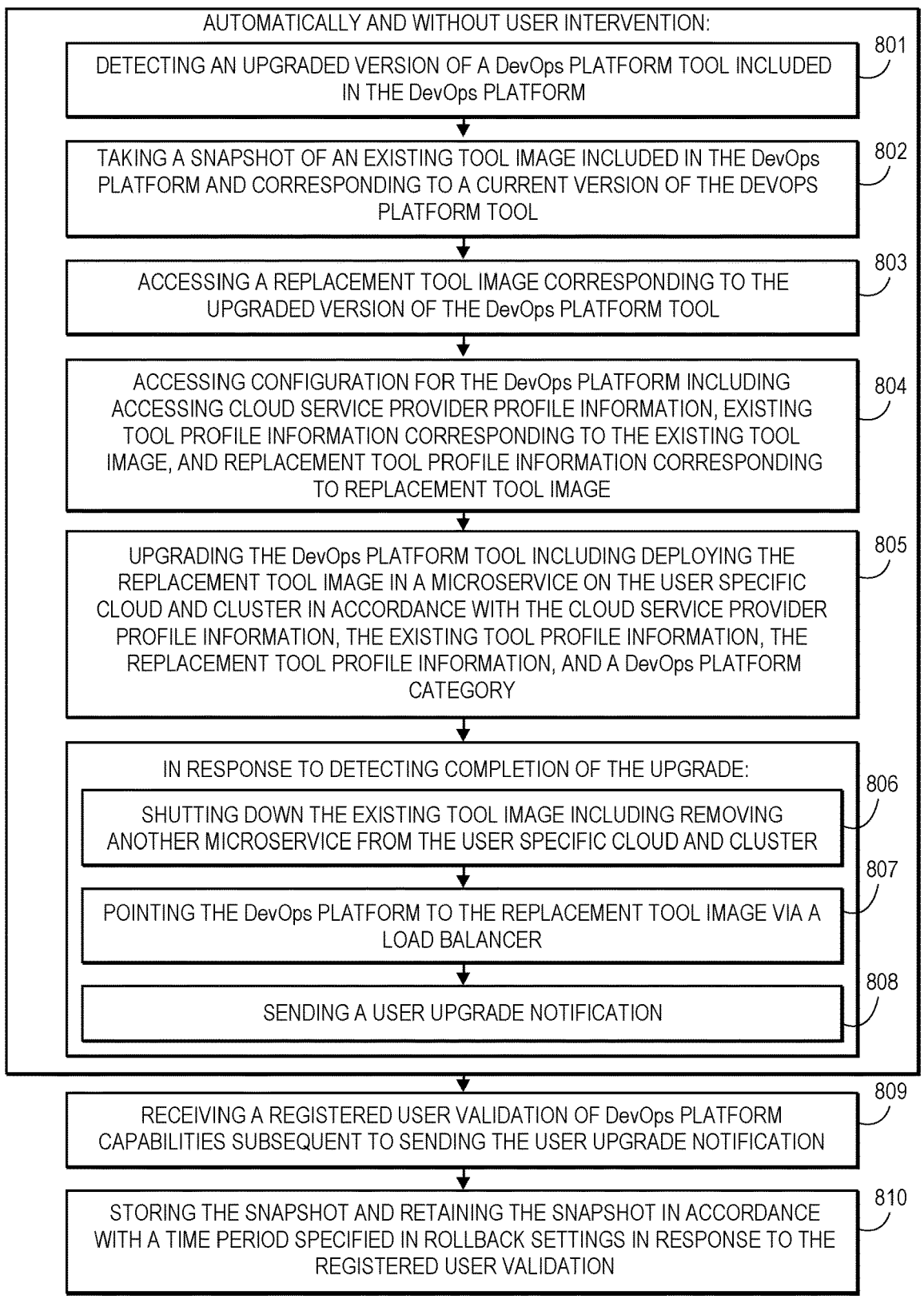
FIG. 8 illustrates a flow chart of an example method for upgrading a development and operations platform.

FIG. 8 illustrates a flow chart of an example method 800 for upgrading a development and operations platform. Method 800 will be described with respect to the components and data in computer architecture 700.

Method 800 includes, automatically and without user intervention, detecting an upgraded version of a DevOps platform tool included in the DevOps platform (801). For example, platform configuration tool 201 can detect upgrade 792 (either by polling upgrade locations 791 or being notified by upgrade locations 791). Upgrade 792 can indicate that an upgraded version of tool image 744 existing is available.

Method 800 includes, automatically and without user intervention, taking a snapshot of an existing tool image included in the DevOps platform and corresponding to a current version of the DevOps platform tool (802). For example, platform configuration module 201 can take snapshot 781 of tool image 744 existing. Tool image 744 existing can correspond to a current version of DevOps tool 712A.

Method 800 includes, automatically and without user intervention, accessing a replacement tool image corresponding to the upgraded version of the DevOps platform tool (803). For example, platform configuration module 201 can access replacement tool image 744 upgrade and tool profile information 714A corresponding to an upgraded version of DevOps tool 712A.

Method 800 includes, automatically and without user intervention, accessing configuration for the DevOps platform including accessing cloud service provider profile information, existing tool profile information corresponding to the existing tool image, and replacement tool profile information corresponding to replacement tool image (804). For example, platform configuration module 201 can access platform information 738 from tool registry 219. As described, platform information 738 can indicate chained and connected tool images as well as dependencies, sequence, and compatibility between deployed tool images in cloud 741/cluster 742. Platform information 738 can also include relevant tool profile information and provider profile information for resources allocated to and tools deployed to cloud 741/cluster 742. As such, platform information 738 can include information about chain and connection 749 and information about dependencies, sequence, and compatibility between tool image 743 and tool image 744 existing.

Method 800 includes, automatically and without user intervention, upgrading the DevOps platform tool including deploying the replacement tool image in a microservice on the user specific cloud and cluster in accordance with the cloud service provider profile information, the existing tool profile information, the replacement tool profile information, and a DevOps platform category (805). For example, tool management module 203 can initiate upgrade 721 to cloud 741/cluster 742. Upgrade 721 can include deploying tool image 744 upgrade in a microservice in cloud 741/cluster 742 in accordance with platform information 738, tool profile information 714A, and a category associated with DevOps platform tool 712A.

In one aspect, tool image 744 upgrade is deployed to on-premise resources associated with user 501. In another aspect, tool image 744 upgrade is deployed to resources of a cloud provider.

When appropriate, tool images can be removed from and/or deployed to clouds/clusters including resources that span multiple cloud service providers and/or that span a cloud service provider and on-premise resources. Cloud and cluster configuration module 202 can implement cloud and/or cluster changes to accommodate replacement tool images. For example, cloud and cluster configuration module 202 can adjust the source, amount, etc. of a resource to accommodate differences in resource consumption between tool image 744 upgrade and tool image 744 existing.

Thus, at time $t_3$, cloud 741/cluster 742 can transition to a configuration that includes tool image 744 upgrade.

Tool management module 203 can determine one or more of: dependencies, sequence, and compatibility between tool image 743 and tool image 744 upgrade. Tool management module 203 can chain and connect 751 tool image 543 and tool image 744 upgrade to one another in accordance with the determined one or more of: the dependencies, the sequence, and the compatibility.

Method 800 includes, automatically and without user intervention and in response to detecting completion of the upgrade, shutting down the existing tool image including removing another microservice from the user specific cloud and cluster (806). For example, upon successful deployment of tool image 744 upgrade, tool management module 203 can shut down tool image 744 existing, including removing a microservice associated with tool image 744 existing from cloud 741/cluster 742.

In one aspect, tool image 744 existing is shut down/removed from on-premise resources associated with user 701. In another aspect, tool image 744 existing is shut down/removed from resources of a cloud provider.

Method 800 includes, automatically and without user intervention and in response to detecting completion of the upgrade, pointing the DevOps platform to the replacement tool image via a load balancer (807). For example, upon successful deployment of tool image 744 upgrade, tool management module 203 can reconfigure load balancer 745 to direct output from tool image 743 to tool image 744 upgrade.

Thus, at time $t_4$, cloud 741/cluster 742 can transition to a configuration that no longer includes tool image 744 existing.

Method 800 includes, automatically and without user intervention and in response to detecting completion of the upgrade, sending a user upgrade notification (808). For example, platform configuration module 203 can send notification 703 to user 701 through user interface 204. In one aspect, notification 703 notifies user 701 to test cloud 741/cluster 742 and tool images deployed therein. In response, user 701 can test and/or undertake other validation of cloud 741/cluster 742 and tool images deployed therein.

Method 800 includes receiving a registered user validation of DevOps platform capabilities subsequent to sending the user upgrade notification (809). For example, user 701 can send validation 704 to platform configuration module 201 through user interface 204. Platform configuration module 201 can receive validation 704 from user 701.

Method 800 includes storing the snapshot and retaining the snapshot in accordance with a time period specified in rollback settings in response to the registered user validation (810). For example, tool management module 203 can store snapshot 781 in storage 782 in accordance with a time period (e.g., 7 days) in rollback settings 783. If user 701 subsequently becomes dissatisfied with tool image 744 upgrade, tool management module 203 can use snapshot 781 to restore tool image 744 existing to cloud 741/cluster 742. When the time period expires, snapshot 781 can be deleted from storage 782.

Platform configuration module 201 can store platform information 739 in tool registry 219 after time $t_4$. Platform information 739 can indicate the configuration of tool images deployed to cloud 741/cluster 742 (i.e., deployed to the "platform"). Platform information 739 can indicate chained and connected tool images as well as dependencies, sequence, and compatibility between deployed tool images deployed to cloud 741/cluster 742. Platform information 739 can also include relevant tool profile information and provider profile information for resources allocated to and tools deployed to cloud 741/cluster 742.

Removing Platform Functionality

Figure 9:
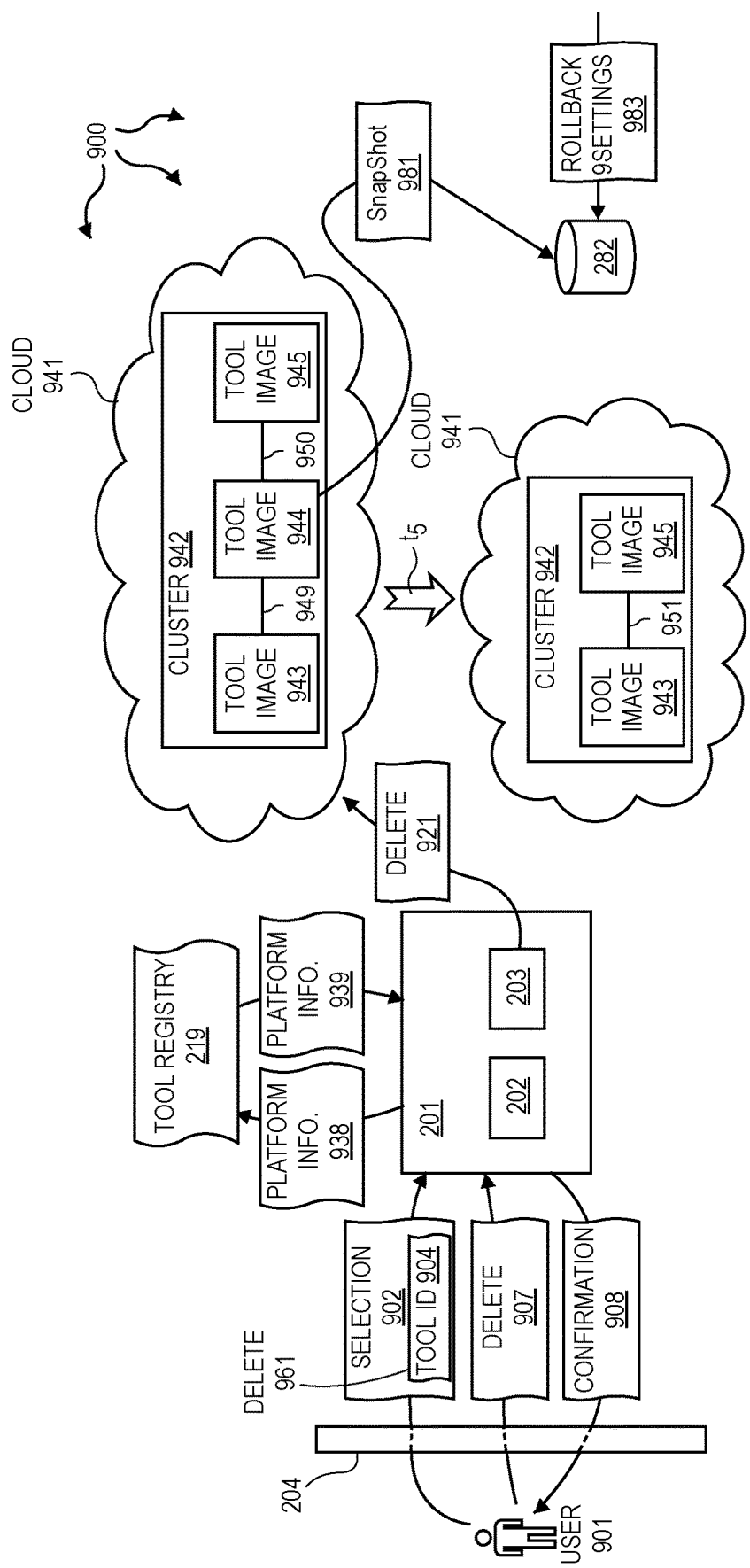
FIG. 9 illustrates an example computer architecture that facilitates removing functionality from a development and operations platform.

FIG. 9 illustrates an example computer architecture 900 that facilitates removing functionality from a development and operations platform. As depicted in computer architecture 900, tool images 943, 944, and 945 are deployed (possibly as microservices) into cloud 941/cluster 942 (which may be a VPC). Cloud 941/cluster 942 can include cloud provider resources and/or on-premise resources. In one aspect, resources of cloud 941/cluster 942 span one or more cloud providers and/or on-premise resources. Tool images 943, 944, and 945 can be associated with DevOps tools in any categories selected from among: configuration management, continuous integration, source control, build tools, containerization, continuous verification, quality and testing, monitoring, logging, security, static code analysis, dynamic code scanning, threat vulnerability management, container scanning, or continuous deployment and continuous delivery.

Platform configuration module 201 can have previously stored platform information 938 for cloud 941/cluster 942 (i.e., the "platform") in tool registry 219. Platform information 938 can indicate chained and connected tool images as well as dependencies, sequence, and compatibility between deployed tool images in cloud 941/cluster 942. Platform information 938 can also include relevant tool profile information and provider profile information for resources allocated to and tools deployed to cloud 941/cluster 942. Platform information 938 can also include security group settings, storage settings, network configuration settings, and load balancer settings corresponding to cloud 941/cluster 942.

Figure 10:
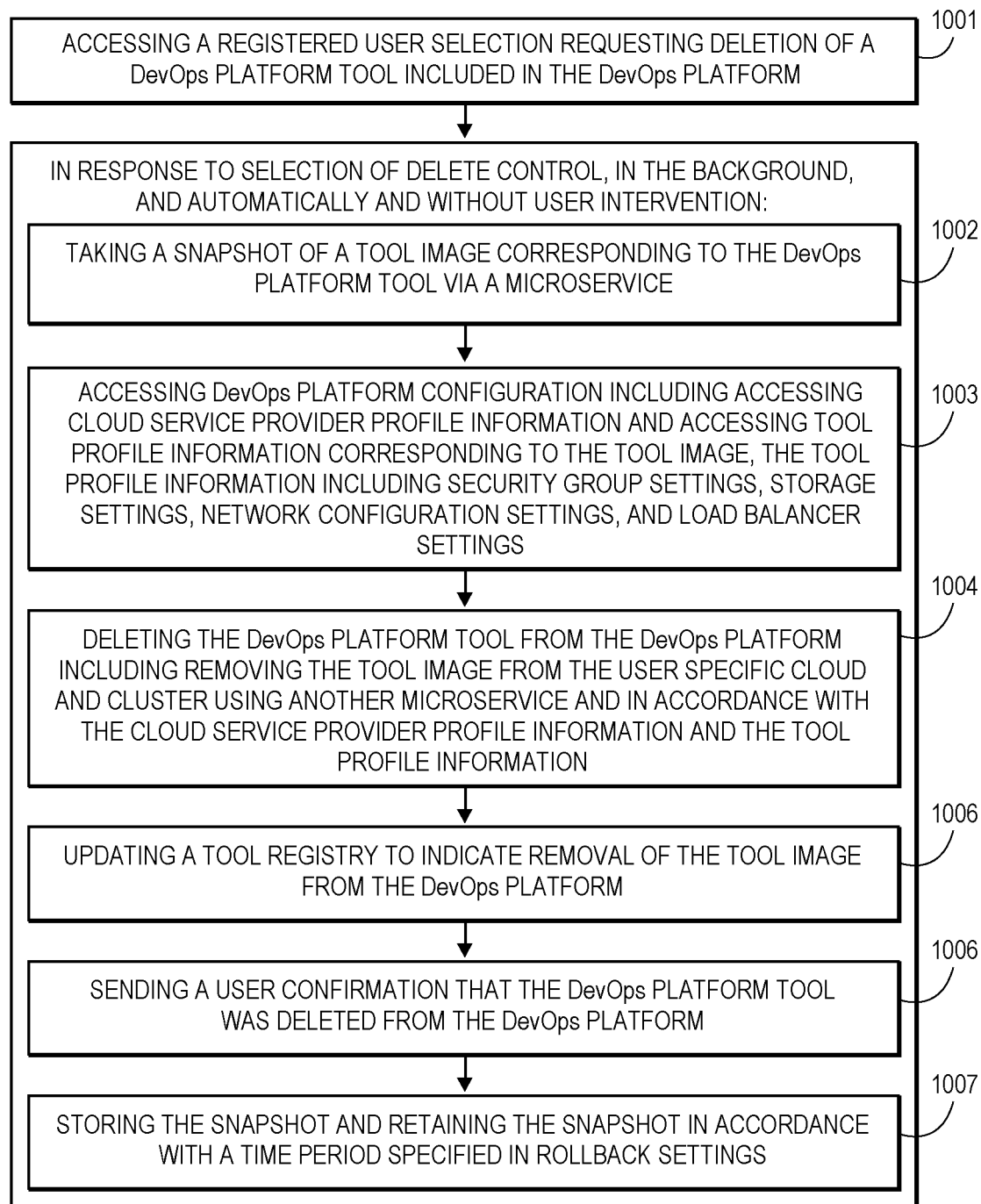
FIG. 10 illustrates a flow chart of an example method for removing functionality from a development and operations platform.

FIG. 10 illustrates a flow chart of an example method 1000 for removing functionality from a development and operations platform. Method 1000 will be described with respect to the components and data in computer architecture 900.

Method 1000 includes accessing a registered user selection requesting deletion of a DevOps platform tool included in the DevOps platform (1001). For example, user 901 can submit selection 902 to platform configuration module 201 through user interface 204. Platform configuration module 201 can receive selection 902 from user 901. As depicted, selection 902 includes delete 561 of tool ID 904. Tool ID 904 can identifying tool image 944 corresponding to a DevOps platform tool.

Method 1000 includes in response to selection of delete control, in the background, and automatically and without user intervention, taking a snapshot of a tool image corresponding to the DevOps platform tool via a microservice (1002). For example, platform configuration module 201 can take snapshot 981 of tool image 944 (corresponding to the DevOps platform tool) via a microservice.

Method 1000 includes, in response to selection of delete control, in the background, and automatically and without user intervention, accessing DevOps platform configuration including accessing cloud service provider profile information and accessing tool profile information corresponding to the tool image, the tool profile information including security group settings, storage settings, network configuration settings, and load balancer settings (1003). For example, platform configuration module 201 can access platform information 938 from tool registry 919. As described, platform information 938 can indicate chained and connected tool images as well as dependencies, sequence, and compatibility between deployed tool images in cloud 941/cluster 942. Platform information 938 can also include relevant tool profile information and provider profile information for resources allocated to and tools deployed to cloud 941/cluster 942. As such, platform information 938 can include information about chain and connections 949 and 950 and information about dependencies, sequence, and compatibility between tool images 943, 944, and 945. Platform information 938 can also include security group settings, storage settings, network configuration settings, and load balancer settings corresponding to cloud 941/cluster 942.

Method 1000 includes, in response to selection of delete control, in the background, and automatically and without user intervention, deleting the DevOps platform tool from the DevOps platform including removing the tool image from the user specific cloud and cluster using another microservice and in accordance with the cloud service provider profile information and the tool profile information (1004). For example, tool management module 203 can implement delete 921 to delete tool image 944 (possibly a microservice) from cloud 541/cluster 542 using another microservice and in accordance with platform information 938.

In one aspect, tool image 944 is deleted from on-premise resources associated with user 901. In another aspect, tool image 944 is removed from resources of a cloud provider.

Thus, at time $t_5$, cloud 941/cluster 942 can transition to a configuration with tool image 944 removed.

Tool management module 203 can determine one or more of: dependencies, sequence, and compatibility between tool image 943 and tool image 945. Tool management module 203 can chain and connect 951 tool image 943 and tool image 945 to one another in accordance with the determined one or more of: the dependencies, the sequence, and the compatibility.

When appropriate, deleted tool images may have been removed from clouds/clusters including resources that span multiple cloud service providers and/or that span a cloud service provider and on-premise resources. Cloud and cluster configuration module 202 can implement cloud and/or cluster changes to accommodate deletion of tool images. For example, cloud and cluster configuration module 202 can adjust the source, amount, etc. of a resource to accommodate differences in resource consumption associated with chain and connections 949 and 950 relative to chain and connection 951.

Method 1000 includes, in response to selection of delete control, in the background, and automatically and without user intervention, updating a tool registry to indicate removal of the tool image from the DevOps platform (1005). For example, platform configuration module 201 can store platform information 939 in tool registry 219 after time $t_5$. Platform information 939 can indicate the configuration of tool images deployed to cloud 941/cluster 942 (i.e., deployed to the "platform") after tool image 944 was deleted. Platform information 939 can indicate chained and connected tool images as well as dependencies, sequence, and compatibility between deployed tool images deployed to cloud 941/cluster 942. Platform information 939 can also include relevant tool profile information and provider profile information for resources allocated to and tools deployed to cloud 941/cluster 942.

Method 1000 includes, in response to selection of delete control, in the background, and automatically and without user intervention, sending a user confirmation that the DevOps platform tool was deleted from the DevOps platform (1006). For example, platform configuration module 201 can send confirmation 908 to user 901 through user interface 204. In one aspect, confirmation notifies user 903 that tool image 944 was successfully deleted from cloud 941/cluster 942.

Method 1000 includes, in response to selection of delete control, in the background, and automatically and without user intervention, storing the snapshot and retaining the snapshot in accordance with a time period specified in rollback settings (1007). For example, tool management module 203 can store snapshot 981 in storage 982 in accordance with a time period (e.g., 7 days) in rollback settings 983. If user 901 subsequently becomes dissatisfied with deletion of tool image 944, tool management module 203 can use snapshot 981 to restore tool image 944 to cloud 941/cluster 942. When the time period expires, snapshot 981 can be deleted from storage 982.

In one aspect, user 901 can submit a time period extension request through user interface 204. Platform configuration module 201 can receive the time period extension request from user 901. In response to receiving the time period extension request, tool management 203 can store snapshot 981 in accordance with an extended time period (e.g., 14 days) in rollback settings 983. When the extended time period expires, snapshot 981 can be deleted from storage 982.

User Onboarding

Figure 11:
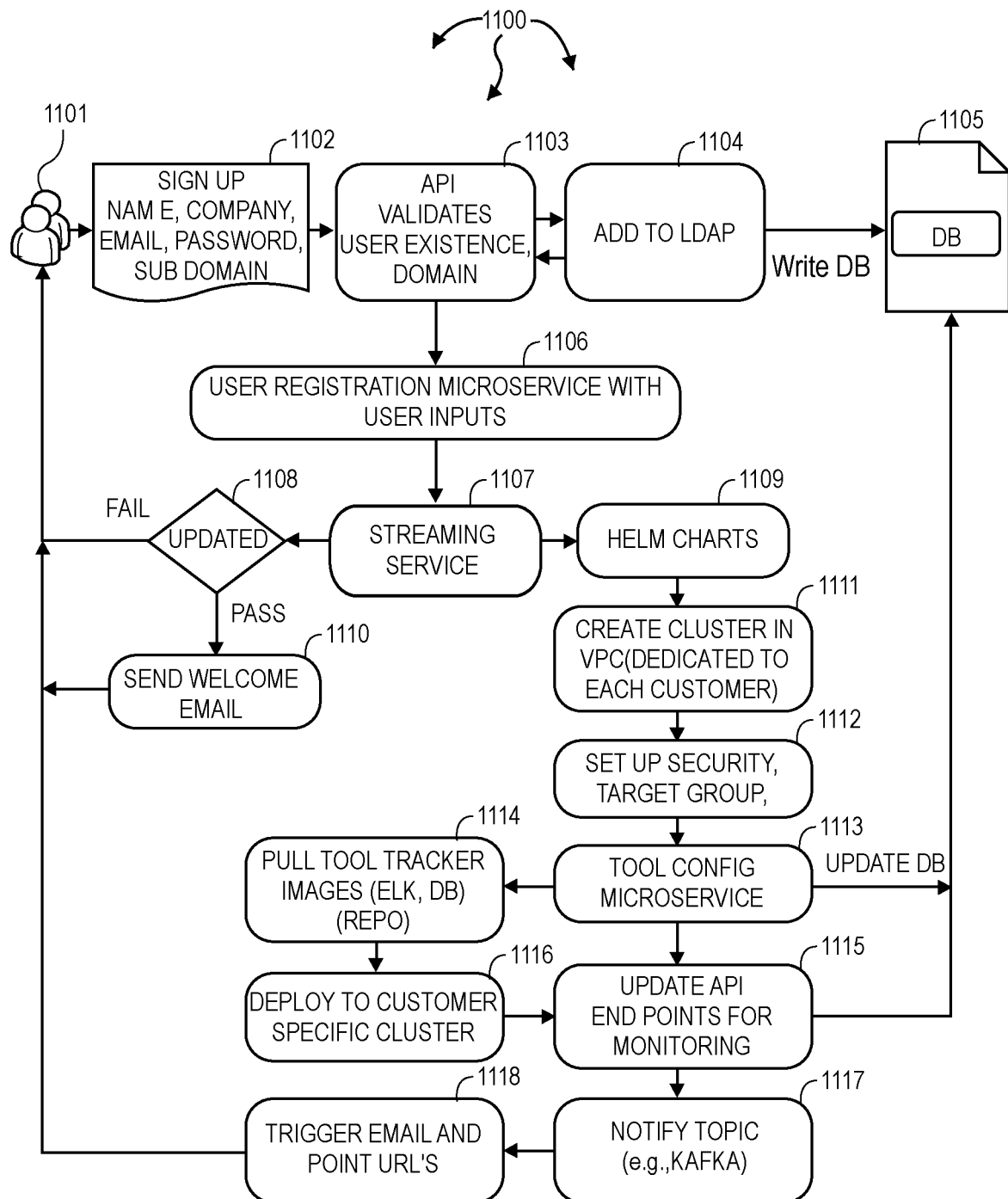
FIG. 11 illustrates a flow chart of an example method for onboarding a user.

FIG. 11 illustrates a flow chart of an example method 1100 for onboarding a user. In one aspect, the modules of computer architecture 200 and/or other similar modules are used to implement method 1100. For example, user interface 204 can facilitate user interactions with a platform provider.

User 1101 can sign up 1102 with a platform provider, including submitting name, company, email, password, and sub domain. In one aspect, sign up is facilitated using ReactJS (or other Script library). The platform provider validates user existence and domain 1103. In one aspect, validation is facilitated by NodeJS (or other scripting runtime environment). The platform provider adds the user to Lightweight Directory Protocol (LDAP) 1104 and writes to (e.g., Mongo) database 1105. In one aspect, OKTA is used to facilitate identity management (e.g., authentication, authorization, etc.).

The platform provider utilizes a user registration microservice with user inputs 1106. In one aspect, a user registration microservice is facilitated using Java (or other scripting language). The platform provider sends user registration microservice with user inputs to a distributed streaming platform (e.g., Kafka) 1107. At 1108, the platform provider determines if user registration was successful. If so (pass at 1108), the platform provider sends a welcome email 1110 (or other message) to user 1101. If not (fail at 1108), the platform provider sends a failure notification email (or other message) to user 1101.

The platform provider can use helm charts (or other packing formats) to describe a related set of cloud and/or on-premise (e.g., Kubernetes) resources 1109. The platform provider can create a cluster in a VPC dedicated to the customer 1111. The platform provider can set up security and a target group 1112. The platform provider can configure a tool microservice 1113. In one aspect, configuration of a tool microservice is facilitated using Java (or other scripting language). The platform provider can update the (e.g., Mongo) database. The platform provider can pull tool images 1114, for example, from a repository. The platform provider can deploy the tool images to a customer specific cluster 1116 (e.g., created at 1111). In one aspect, Kubernetes (or other open source platform for automating containers) facilitates tool image deployment.

The platform provider updates API endpoints for monitoring 1115. In one aspect, API endpoint updating is facilitated using Java (or other scripting language). The platform provider sends monitoring output to a (e.g., Kafka) notification topic 1117. The platform provider triggers notification 1118 and sends an endpoint URL to user 1101. The notification can be via email or other messaging technique.

Platform Spin Up

Figure 12:
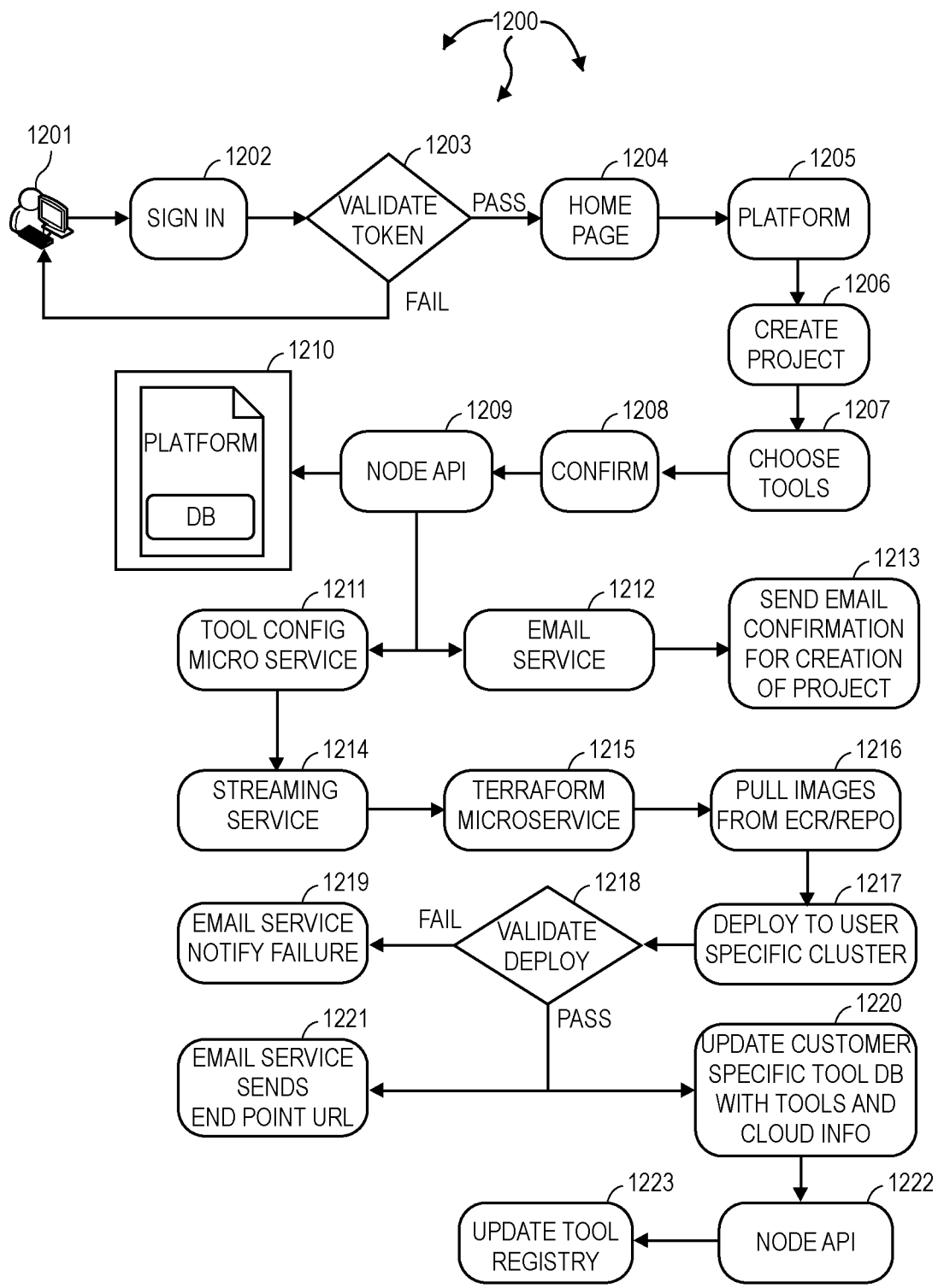
FIG. 12 illustrates a flow chart of an example method for spinning up a DevOps platform.

FIG. 12 illustrates a flow chart of an example method 1200 for spinning up a DevOps platform. In one aspect, the modules of computer architecture 200 and/or other similar modules are used to implement method 1200. For example, user interface 204 can facilitate user interactions with a platform provider.

User 1201 can sign in 1202 with a platform provider. In one aspect, sign in is facilitated using ReactJS (or other Script library). At 1203, the platform provider attempts to validate user 1201's token. In one aspect, token validation is facilitated via LDAP (or other directory access protocol). If token validation fails, user 1201 can be re-prompted. If token validation passes, user 1201 can be taken to a home page 1204. In one aspect, ReactJS (or other Script library) is used to present a home page.

From the homepage, user 1201 can select platform 1205, create a project 1206, choose tools 1207, and confirm 1208. In one aspect, platform selection, project creation, tool selection, and confirmation is facilitated using ReactJS (or other Script library). The provider platform uses node API 1209 to update a (e.g., mongo) database 1210, configure a tool microservice 1211, and access an email (or other message) service 1212. In one aspect, use of a node API is facilitated by NodeJS (or other scripting runtime environment) and configuration of a tool microservice and email access is facilitated using Java (or other scripting language). An email (or other message) can be send to user 1201 confirmation project creation 1213.

The platform provider sends tool configuration microservice to a distributed streaming platform (e.g., Kafka) 1214. The platform provider terraforms the microservice 1215. In one aspect, microservice terraforming is facilitated using Java (or other scripting language). The platform provider can pull tool images 1216, for example, from a repository. The platform provider can deploy the tool images to a customer specific cluster 1217 (e.g., previously created). In one aspect, Kubernetes (or other open source platform for automating containers) facilitates tool image deployment.

At 1218, the platform provider attempts to validate the deployment. If deployment validation fails, the platform provider sends a failure notification email (or other message) 1219 to user 1201. If deployment validation passes, the platform provider sends an email (or sends another message) 1221 with a URL endpoint to user 1201. The platform provider updates a customer specific database with tools and cloud information 1220. The provider platform uses node API 1222 to update a tool registry 1223. In one aspect, use of a node API and tool registry update is facilitated by NodeJS (or other scripting runtime environment).

Platform Tool Upgrade

Figure 13:
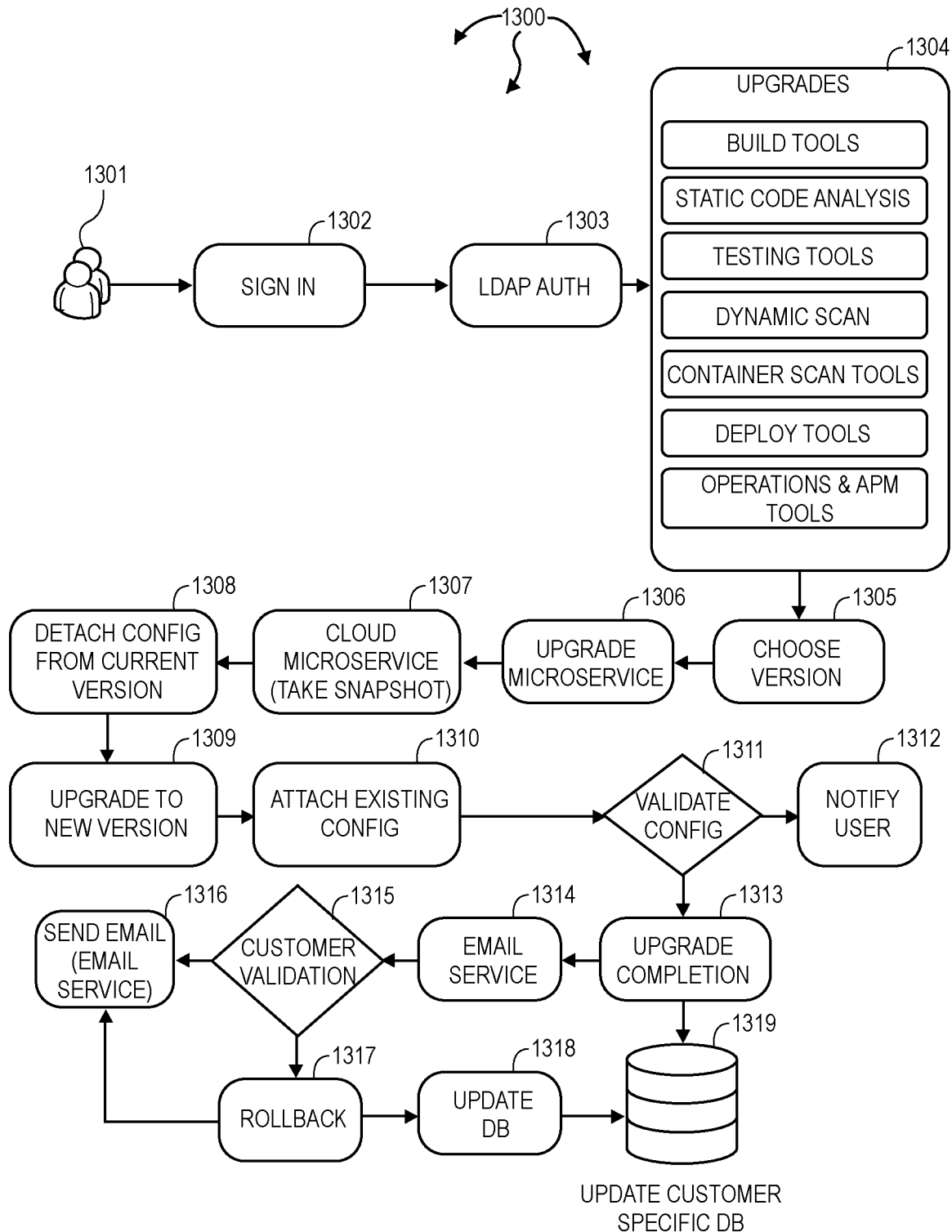
FIG. 13 illustrates a flow chart of an example method for upgrading a DevOps platform tool.

FIG. 13 illustrates a flow chart of an example method 1300 for upgrading a DevOps platform tool. In one aspect, the modules of computer architecture 200 and/or other similar modules are used to implement method 1300. For example, user interface 204 can facilitate user interactions with a platform provider.

User 1301 can sign in 1302 with a platform provider. In one aspect, sign in is facilitated using ReactJS (or other Script library). The user can be validated via LDAP (or other directory access protocol) 1303. The platform provider can present upgrades 1304 to user 1301 and user 1301 can chose a version 1305. In one aspect, presentation of upgrades and version selection is facilitated using ReactJS (or other Script library).

The platform provider upgrades a microservice 1306, takes a snapshot of the microservice 1307, detaches configuration from a current version 1308, upgrades to a new version 1309, attaches configuration to the new version 1310, and attempts to validate the upgrade 1311. In one aspect, microservice upgrade, capturing a snapshot, configuration detachment and attachment, version upgrade, and upgrade validation is facilitated using Java (or other scripting language).

If upgrade validation fails, the platform provider sends a failure notification email (or another message) 1312 to user 1301. If upgrade validation passes, the platform provider completes the upgrade 1313, updates a customer specific (e.g., mongo) database 1319 to indicate the upgrade, and sends an email (or sends other message) 1314 to user 1301 requesting human approval 1315. In one aspect, requesting human approval is facilitated using ReactJS (or other Script library).

If user 1301 approves, the platform provider sends an email (or sends another message) 1316 with a URL endpoint (to the upgraded version) to user 1301. If user 1301 does not approve, user 1301 can be presented with an option to rollback to the current version 1317. In one aspect, presenting a rollback option is facilitated using ReactJS (or other Script library).

Upon user selection of rollback 1317, the platform provider sends an email (or sends another message) 1316 with a URL endpoint (to the current version) to user 1301. The platform provider updates 1318 the customer specific (e.g., mongo) database 1319 to indicate the rollback (and possibly overwriting or removing previously saved indications of the upgrade).

Platform Tool Deletion

Figure 14:
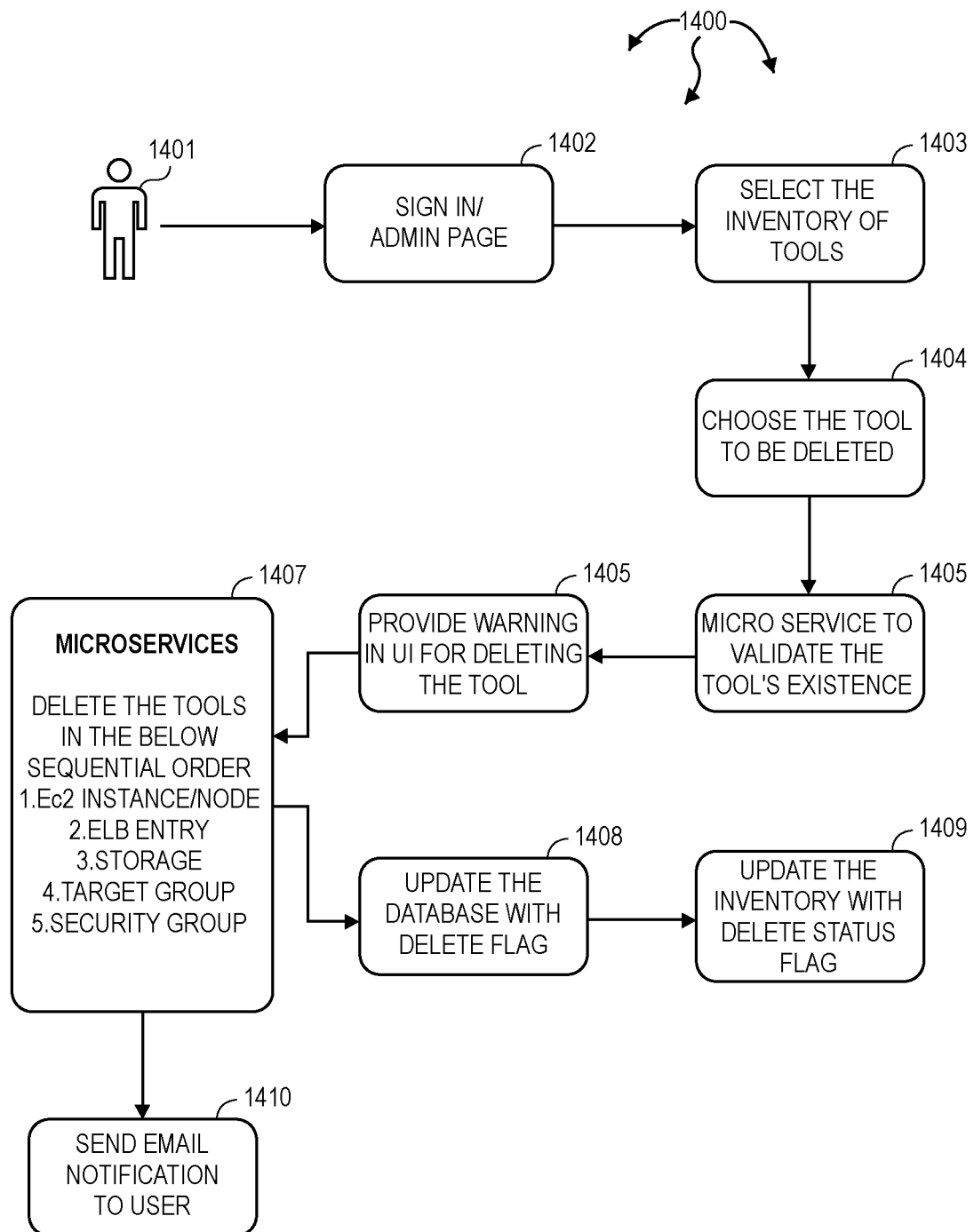
FIG. 14 illustrates a flow chart of an example method for deleting a DevOps platform tool.

FIG. 14 illustrates a flow chart of an example method 1400 for deleting a DevOps platform tool. In one aspect, the modules of computer architecture 200 and/or other similar modules are used to implement method 1400. For example, user interface 204 can facilitate user interactions with a platform provider.

User 1401 can sign in and go to an admin page 1402. The user can select an inventory of tools 1403 and choose a tool to be deleted 1404. In one aspect, sign in, admin page access, tool inventory selection, and choosing a tool to delete is facilitated using ReactJS (or other Script library). A microservice can validate that the tool exists 1405. A platform provider can provider a warning in UI for deleting the tool 1406. In one aspect, providing a warning is facilitated using ReactJS (or other Script library).

Microservices can delete tools in sequential order 1407. The platform provider can update a database (e.g., Mongo) with a delete flag 1408 and can update the inventory with a delete flag 1409. The platform provider can send an electronic mail (or other notification) 1410 to user 1401.

Tool Registry

As part of tool chain automation, upon successful deployment of tools, a tool registry (e.g., tool registry 219) gets updated automatically with a list of tools and configuration details. Thus, users can bring their own tools and register their tools via the tool registry. In one aspect, a user registers a tool that is subsequently utilized by the user and/or other users. As such, a user can share tools with other users through the tool registry.

Figure 15:
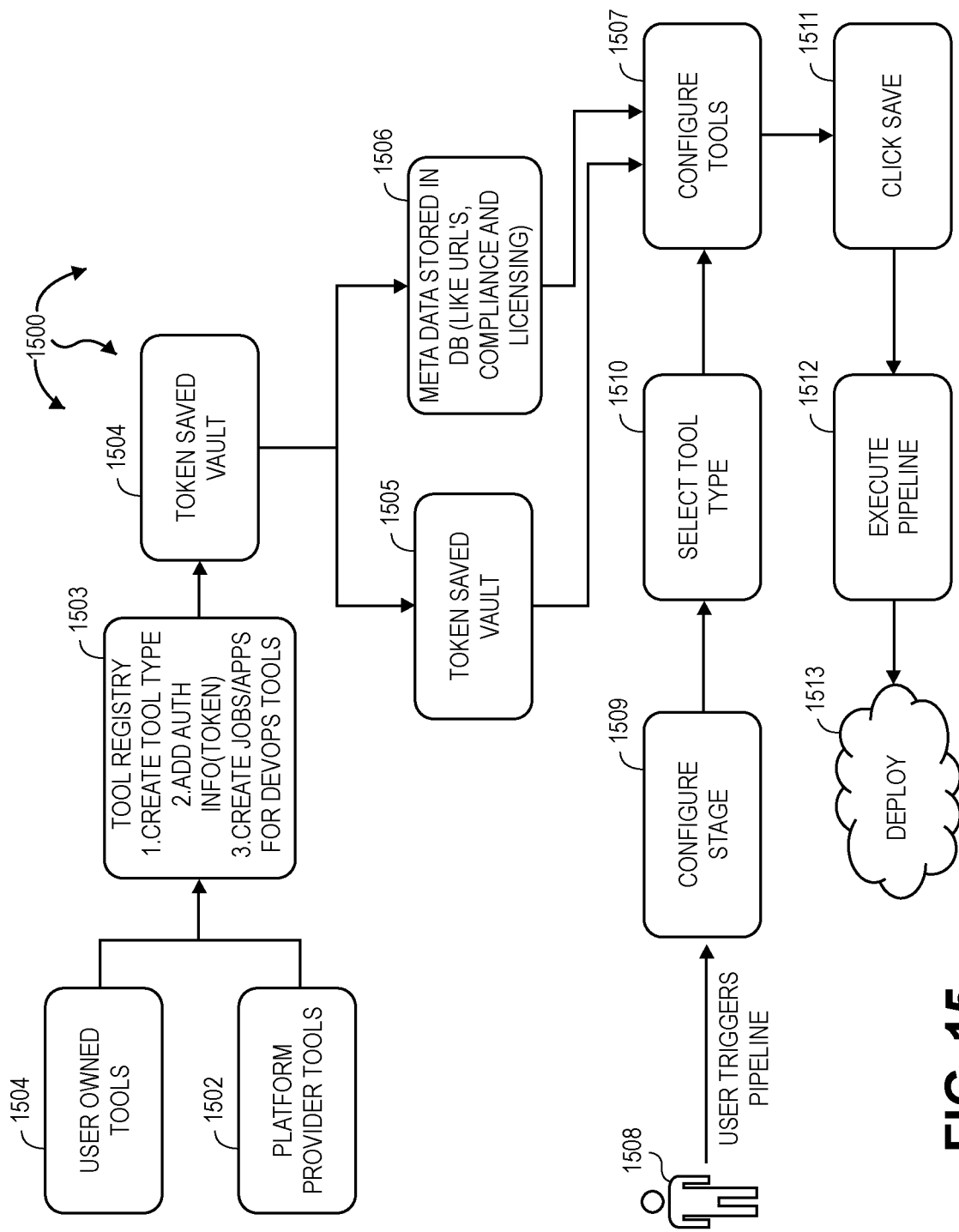
FIG. 15 illustrates a flow chart of an example method for registering a DevOps platform tool.

FIG. 15 illustrates a flow chart of an example method for registering a DevOps platform tool. In one aspect, the modules of computer architecture 200 and/or other similar modules are used to implement method 1500. For example, user interface 204 can facilitate user interactions with a platform provider.

User owned tools 1501 and platform provider tools 1502 can be included and saved 1504 in a tool registry 1503. Per tool a token can be saved in a vault 1505 and metadata stored in a database 1506 (e.g., in one aspect both the vault and database are part of tool registry 219). User 1508 can trigger a pipeline. The user can configure a pipeline stage 1509, select a tool type 1510, and configure tools 1507. Configuring tools 1507 can include accessing saved tool tokens from the vault and stored tool metadata from the database (e.g., both from tool registry 219). User 1508 can save the pipeline 1511, execute the pipeline 1512, and deploy the pipeline 1513. Pipeline deployment can be to on-premise resources and/or cloud-based resources.

A tool registry can be similar to a Configuration Management Database that includes information related to compliance, licensing, contact information, owner, project, application, contact information, create configuration metadata that can be reusable in pipeline and analytics. If there is tool failure, a provider can use the contact information to alert an operations team. If a license is expiring, expired, and/or out of compliance due to security reasons, a provider can use the compliance information to proactively alert users and/or an operations team. The provider can also turn off the tool in a pipeline and/or analytics to avoid compliance and/or security penalties.

In one aspect, a submission of a DevOps tool is received from a user. For example, referring back to FIG. 2, a user can submit a user provided tool 221 to platform configuration module 201 (possibly through user interface 204). Platform configuration module 201 can receive the user provided tool 221 from the user.

Tool authentication information and tool configuration data associated with the DevOps tool can also received through an interface from the user. For example, the user can submit tool authentication information (e.g., a token) and tool configuration data (e.g., compliance, licensing, contact information, owner, project, application, contact information, create configuration metadata, etc.) through user interface 204. Platform configuration module 201 can receive the tool authentication information and tool configuration data from the user through user interface 204.

The DevOps tool can be stored in a tool registry including storing the authentication information in a vault and storing the tool configuration data in a database. In one aspect, tool registry 219 includes a vault and a database. Platform configuration module 201 can store the user provided tool 221 in tool registry 219 including storing the authentication information (e.g., token) in the vault and storing the tool configuration data in the database.

Once a user registers a DevOps tool, the user (as well as other users) can create jobs and manage the configuration. Users can use the configuration and jobs across multiple pipelines without providing further manual inputs (or other user intervention).

As such, subsequent to storing the DevOps tool in the tool registry, a selection of the DevOps tool for inclusion in the DevOps job can be received. The DevOps job can also include one or more other DevOps tools. For example, transitioning briefly to FIG. 3, user 301 can, through user interface 204, select the user provided tool 221 for inclusion in a DevOps job along with one or more other DevOps tools. Platform configuration module 201 can receive the selection of user provided tool 221 from the user interface 204. User 301 can be the same user that initially submitted the user provided tool 221 or can be a different user.

In response to receiving the selection and automatically and without further user intervention, the DevOps tool is accessed from the tool registry. Accessing the DevOps tool includes accessing the authentication information (e.g., token) from the vault and accessing the tool configuration data from the database. For example, platform configuration module 201 can automatically access the user provided tool 221 from tool registry 219. Accessing user provided tool 221 can include accessing the authentication information from the vault and accessing the tool configuration data from the database.

Also in response to receiving the selection and automatically and without further user intervention, the DevOps tool is configured. The DevOps tool can be configured in accordance with the accessed authentication information (e.g., token) and accessed tool configuration data as part of the DevOps job and for interaction with the one or more other DevOps tools. For example, platform configuration module 201 can automatically configure the user provided tool 221 in accordance with the accessed authentication information and accessed tool configuration data as part of the DevOps job and for interaction with the one or more other DevOps tools. The DevOps job can be deployed. For example, platform configuration module 201 can deploy the DevOps job, such as, for inclusion in a pipeline.

Accordingly, a tool registry provides utilization across DevOps tools and helps users (e.g., customers) to rationalize DevOps tools across their environment.

Deregistering A Subdomain

Figure 16:
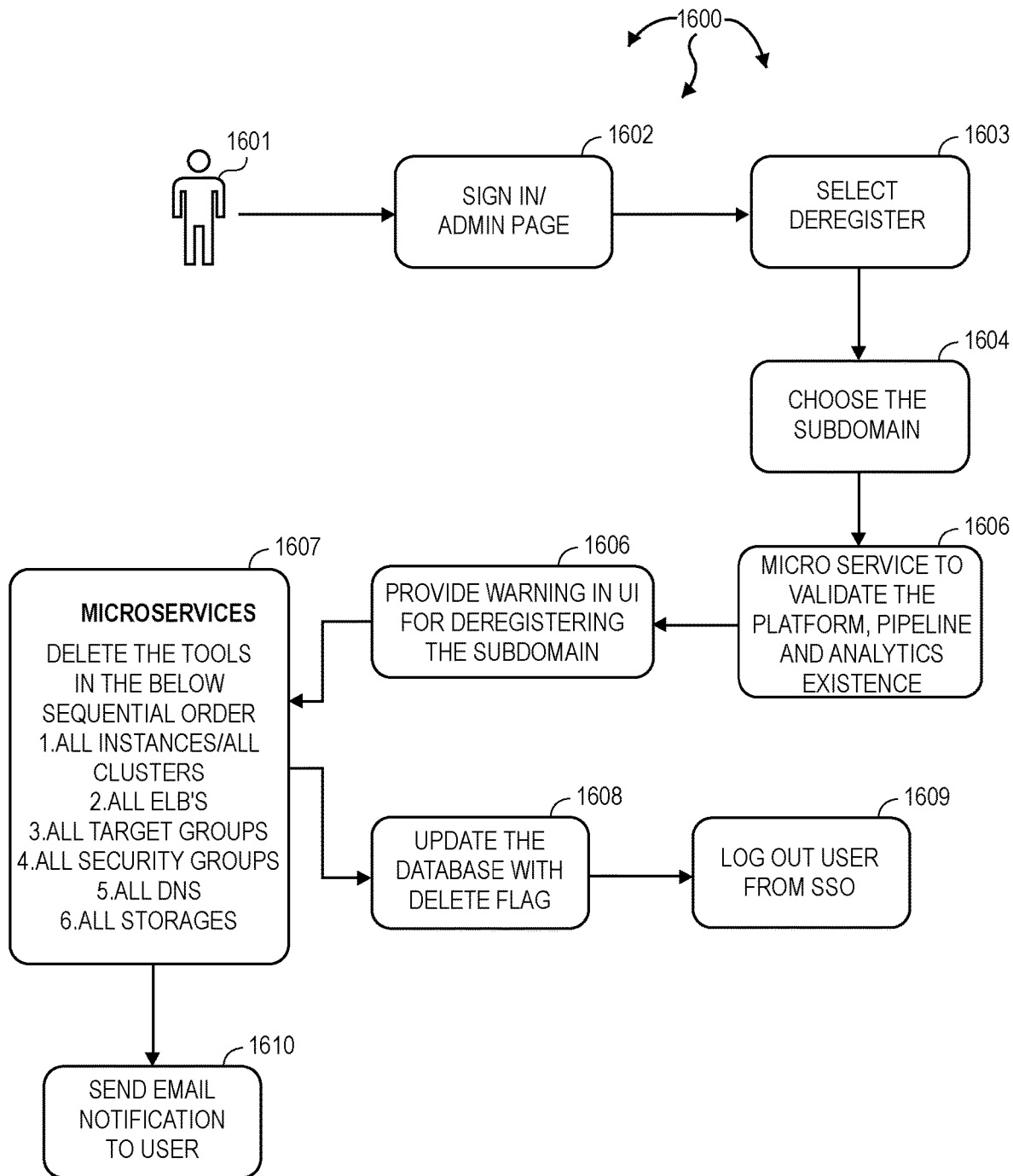
FIG. 16 illustrates a flow of an example method for deregistering a subdomain.

FIG. 16 illustrates a flow of an example method for deregistering a subdomain. In one aspect, the modules of computer architecture 200 and/or other similar modules are used to implement method 1600. For example, user interface 204 can facilitate user interactions with a platform provider.

User 1601 can sign in and go to an admin page 1602. The user can select deregister 1603 and choose a subdomain 1604. In one aspect, sign in, admin page access, deregister selection, and choosing a subdomain is facilitated using ReactJS (or other Script library). A microservice can validate existence of platform, pipeline, and analytics 1605. A platform provider can provider a warning in UI for deregistering the subdomain 1606. In one aspect, providing a warning is facilitated using ReactJS (or other Script library).

Microservices can delete tools in sequential order 1607. The platform provider can update a database (e.g., Mongo) with a delete flag 1608 and can log out from Single User Signon 1609. The platform provider can send an electronic mail (or other notification) 1610 to user 1601.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: user input, user selections, user provided DevOps tools, platform provided DevOps tools, tool images, tool profile information, tool registries, provider profile information, on-premise profile information, cloud provider profile information, tool catalogs, provider IDs, tool IDs, deploy commands, replace commands, platform information, removal instructions, deploy instructions, upgrade registrations, upgrade notifications, user validations, upgrade instructions, snapshots, rollback settings, delete commands, delete instructions, confirmations, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, user input, user selections, user provided DevOps tools, platform provided DevOps tools, tool images, tool profile information, tool registries, provider profile information, on-premise profile information, cloud provider profile information, tool catalogs, provider IDs, tool IDs, deploy commands, replace commands, platform information, removal instructions, deploy instructions, upgrade registrations, upgrade notifications, user validations, upgrade instructions, snapshots, rollback settings, delete commands, delete instructions, confirmations, etc.

Implementations of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, servers, mobile telephones, PDAs, tablets, routers, switches, and the like. The described aspects may also be practiced in distributed system environments (e.g., cloud environments) where local and remote computer systems, which are linked (either by hardwired data links, wireless data links, or by a combination of hardwired and wireless data links) through a network, both perform tasks. In a distributed system environment, program modules may be located in both local and remote memory storage devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as on premise, private cloud, community cloud, public cloud, hybrid cloud, and so forth. In this description and in the following claims, a "cloud computing environment" is an environment in which cloud computing is employed.

Hybrid cloud deployment models combine portions of other different deployment models, such as, for example, a combination of on premise and public, a combination of private and public, a combination of two different public cloud deployment models, etc. Thus, resources utilized in a hybrid cloud can span different locations, including on premise, private clouds, (e.g., multiple different) public clouds, etc.

IaaS is a category of cloud computing services that provide higher-level APIs used to dereference various low-level details of underlying network infrastructure like physical computing resources, location, data partitioning, scaling, security, backup, etc. PaaS is a category of that provides a platform allowing customers to develop, run, and manage applications without the complexity of building and maintaining the infrastructure typically associated with developing and launching an application. SaaS is a category of cloud computing services and a software licensing and delivery model in which software is licensed on a subscription basis and is centrally hosted.

Using PaaS models, a consumer can deploy consumer-created or acquired applications created using programming languages, libraries, services, tools supported by the provider, etc. to a cloud infrastructure. The consumer does not necessarily manage or control the underlying cloud infrastructure including network, servers, operating systems, or storage, but can control deployed applications and possibly configuration settings for an application-hosting environment.

In PaaS models, providers can deliver a computing platform, typically including operating system, programming-language execution environment, database, and web server. Application developers develop and run their software on a cloud platform instead of directly buying and managing the underlying hardware and software layers. With some PaaS, the underlying computer and storage resources scale automatically to match application demand so that the cloud user does not have to allocate resources manually.

Per DevOps tool, aspects of the invention can be implemented on cloud computing models that span one or more of on-premise, IaaS, and PaaS. As such, DevOps tools deployed using different models can be interconnected and managed as described. For example, a registered user's on-premise DevOps tool can be connected and chained with another DevOps tool deployed using a PaaS model. Per DevOps tool, cloud computing models can also be adjusted. For example, an on-premise DevOps tool can be re-deployed to a cloud or vice versa. A platform configuration module (e.g., 201) can manage redeploying and reconnecting and rechaining redeployed DevOps tools to other DevOps tools in a DevOps platform. In one aspect, virtual private clouds are utilized to abstract different cloud computing models corresponding to different DevOps tools.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method for configuring a DevOps platform comprising:
    accessing a registered user selection of: (1) a provider, (2) a first DevOps platform tool associated with a first DevOps platform category, and (3) a second DevOps platform tool associated with a second DevOps platform category; and
    in response to selection of a deploy control, automatically and without user intervention:
        accessing provider profile information associated with the service provider;
        accessing a first tool image and first tool profile information corresponding to the first DevOps platform tool;
        accessing a second tool image and second tool profile information corresponding to the second DevOps platform tool;
        forming a user specific cloud and cluster corresponding to the registered user and using resources of the provider in accordance with the provider profile information; and
        deploying the first tool image and the second tool image to the user specific cluster in accordance with the first tool profile information, the first DevOps platform category, the second tool profile information, the second DevOps platform category, and the provider profile information.

2. The method of claim 1, wherein accessing a registered user selection of a first DevOps platform tool associated with a first DevOps platform category comprises accessing a registered user selection of a first DevOps platform tool associated with a first DevOps platform category, the first DevOps platform category selected from among: configuration management, continuous integration, continuous verification, quality and testing, monitoring, logging, security, static code analysis, dynamic code scanning, threat vulnerability management, container scanning, or continuous deployment and continuous delivery.

3. The method of claim 2, wherein accessing a registered user selection of a second DevOps platform tool associated with a second DevOps platform category comprises accessing a registered user selection of a second DevOps platform tool associated with a second DevOps platform category, the second DevOps platform category selected from among: configuration management, continuous integration, continuous verification, quality and testing, monitoring, logging, security, static code analysis, dynamic code scanning, threat vulnerability management, container scanning, or continuous deployment and continuous delivery.

4. The method of claim 3, wherein the first category is different than the second category.

5. The method of claim 1, wherein accessing a registered user selection of a first DevOps platform tool comprises accessing one registered user selection of a user provided DevOps platform tool; and
    wherein accessing a registered user selection of a second DevOps platform tool comprises accessing another registered user selection of a DevOps platform tool selected from a platform provider catalog.

6. The method of claim 1, wherein deploying the first tool image and the second tool image to the user specific cluster comprises connecting and chaining the first tool image and the second tool image to one another.

7. The method of claim 6, further comprising, prior to connecting and chaining the first tool image and the second tool image to one another, determining one or more of: dependencies, sequence, and compatibility between the first tool image and the second tool image; and
    wherein connecting and chaining the first tool image and the second tool image to one another comprises connecting and chaining the first tool image and the second tool image to one another in accordance with the determined one or more of: the dependencies, the sequence, and the compatibility.

8. The method of claim 1, further comprising, prior to deploying the first tool image and the second tool image, determining one or more of: dependencies, sequence, and compatibility between the first tool image and the second tool image; and
    wherein deploying the first tool image and the second tool image comprises deploying the first tool image and the second tool image in accordance with the determined one or more of: the dependencies, the sequence, and the compatibility.

9. The method of claim 8, wherein determining one or more of: dependencies, sequence, and compatibility between the first tool image and the second tool image comprises determining dependencies between the first tool image and the second tool image; and
    wherein deploying the first tool image and the second tool image comprises automatically managing the dependencies between the first tool image and the second tool image.

10. The method of claim 1, wherein forming a user specific cluster comprises forming a user specific cluster that includes both registered user on-premise resources and cloud service provider resources; and
    wherein deploying the first tool image and the second tool image to the user specific cluster comprises deploying the first tool image on the registered user on-premise resources and deploying the second tool image on the cloud service provider resources.

11. The method of claim 1, wherein accessing a registered user selection comprises accessing a registered user selection of another cloud service provider, the other cloud service provider different than the cloud service provider;
    further comprising accessing other provider profile information associated with the other cloud service provider;
    wherein forming a user specific cloud and cluster comprises forming the user specific cloud and cluster using resources of the cloud service provider in accordance with the provider profile information and use using resources of the other cloud service provider in accordance with the other provider profile information; and wherein deploying the first tool image and the second tool image to the user specific cluster comprises deploying the first tool image on the cloud service provider resources and deploying the second tool image on the other cloud service provider resources.

12. The method of claim 1, wherein deploying the first tool image and the second tool image comprises deploying a first microservice and a second microservice corresponding to the first tool image and the second tool image respectively.

13. The method of claim 1, further comprising creating a virtual private cloud for the registered user;
wherein forming a user specific cloud and cluster comprises forming the user specific cloud and cluster in the virtual private cloud;
wherein deploying the first tool image comprises deploying a first microservice in the virtual private cloud; and
wherein deploying the second tool image comprises deploying a second microservice in the virtual private cloud.

14. The method of claim 13, further comprising allocating separate and dedicated database resources and log aggregation resources to the virtual provide cloud.

15. The method of claim 1, wherein forming a user specific cluster corresponding to the registered user comprises forming a cluster that includes on-premise resources of the registered user and resources of the cloud service provider.

16. The method of claim 1, wherein accessing a registered user selection comprises accessing the registered user selection through a unified self-service portal.

17. The method of claim 1, further comprising:
updating a tool registry to indicate that the first DevOps platform tool and the second DevOps platform tool are deployed in the DevOps platform; and
storing configuration information associated with the first DevOps platform tool and the second DevOps platform tool in the tool registry.

18. A system comprising:
a processor;
system memory coupled to the processor and storing instructions configured to cause the processor to:
access a registered user selection of: (1) a provider, (2) a first DevOps platform tool associated with a first DevOps platform category, and (3) a second DevOps platform tool associated with a second DevOps platform category; and
in response to selection of a deploy control, automatically and without user intervention:
access provider profile information associated with service provider;
access a first tool image and first tool profile information corresponding to the first DevOps platform tool;
access a second tool image and second tool profile information corresponding to the second DevOps platform tool;
form a user specific cloud and cluster corresponding to the registered user and using resources of the provider in accordance with the provider profile information; and
deploy the first tool image and the second tool image to the user specific cluster in accordance with the first tool profile information, the first DevOps platform category, the second tool profile information, the second DevOps platform category, and the provider profile information.

19. The system of claim 18, further comprising instructions configured to create a virtual private cloud for the registered user;
wherein instructions configured to form a user specific cloud and cluster comprise instructions configured to form the user specific cloud and cluster in the virtual private cloud;
wherein instructions configured to deploy the first tool image comprise instructions configured to deploy a first microservice in the virtual private cloud; and
wherein deploying the second tool image comprises deploying a second microservice in the virtual private cloud.

20. The system of claim 18, wherein instructions configured to access a registered user selection comprise instructions configured to access a registered user selection of another cloud service provider, the other cloud service provider different than the cloud service provider;
further comprising instructions configured to access other provider profile information associated with the other cloud service provider;
wherein instructions configured to form a user specific cloud and cluster comprise instructions configured to form the user specific cloud and cluster using resources of the cloud service provider in accordance with the provider profile information and use using resources of the other cloud service provider in accordance with the other provider profile information; and
wherein instructions configured to deploy the first tool image and the second tool image to the user specific cluster comprise instructions configured to deploy the first tool image on the cloud service provider resources and deploy the second tool image on the other cloud service provider resources.

* * * * *